US011937309B2

(12) United States Patent
Shi et al.

(10) Patent No.: US 11,937,309 B2
(45) Date of Patent: Mar. 19, 2024

(54) COMMUNICATION METHOD, APPARATUS, AND SYSTEM

(71) Applicant: Huawei Technologies Co., Ltd., Shenzhen (CN)

(72) Inventors: Xiaoli Shi, Shanghai (CN); Mingzeng Dai, Shenzhen (CN); Wenjie Peng, Shanghai (CN); Jun Wang, Shanghai (CN); Qufang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 17/487,700

(22) Filed: Sep. 28, 2021

(65) Prior Publication Data

US 2022/0022267 A1 Jan. 20, 2022

Related U.S. Application Data

(63) Continuation of application No. PCT/CN2020/080454, filed on Mar. 20, 2020.

(30) Foreign Application Priority Data

Mar. 29, 2019 (CN) .......................... 201910252536.5

(51) Int. Cl.
*H04W 72/044* (2023.01)
*H04L 5/00* (2006.01)
(Continued)

(52) U.S. Cl.
CPC ....... *H04W 74/0841* (2013.01); *H04L 5/0051* (2013.01); *H04W 56/001* (2013.01); *H04W 72/044* (2013.01); *H04W 74/0866* (2013.01)

(58) Field of Classification Search
CPC .. H04L 5/005; H04W 56/001; H04W 72/044; H04W 74/0866
(Continued)

(56) References Cited

U.S. PATENT DOCUMENTS 6,058,307 A * 5/2000 Garner ............... H04B 7/18567
455/12.1
8,649,288 B2 2/2014 He et al.
(Continued)

FOREIGN PATENT DOCUMENTS

CN 102843706 A 12/2012
CN 107889244 A 4/2018
(Continued)

OTHER PUBLICATIONS

Qualcomm Incorporated, "CR on random access resource selection for beam failure recovery," 3GPP TSG-RAN WG2 Meeting NR ad-hoc #1, Vancouver, Canada, Jan. 22-26, 2018, R2-1801443, 4 pages.

(Continued)

*Primary Examiner* — Dang T Ton
(74) *Attorney, Agent, or Firm* — Slater Matsil, LLP

(57) ABSTRACT

This application provides a communication method, apparatus, and system. The method includes: determining first information, where the first information includes one or more types of information about an associated beam for a random access success of the terminal device, or, information about an associated uplink carrier for a random access success of the terminal device, and/or includes information about a random access channel RACH resource for a random access failure of the terminal device, and the random access failure of the terminal device includes one or more of a 2-step random access failure, a 4-step random access failure, a dedicated RACH resource random access failure, or a common RACH resource random access failure; and sending the first information.

24 Claims, 5 Drawing Sheets

(51) Int. Cl.
*H04W 56/00* (2009.01)
*H04W 74/08* (2009.01)

(58) Field of Classification Search
USPC .............................. 370/400, 401, 402, 329
See application file for complete search history.

(56) References Cited

U.S. PATENT DOCUMENTS

| | | |
|---|---|---|
| 10,912,124 B2 | 2/2021 | Zhang |
| 10,945,225 B2 | 3/2021 | Ohara et al. |
| 11,553,528 B2 | 1/2023 | Chen et al. |
| 2010/0323710 A1 | 12/2010 | Chen |
| 2014/0241285 A1 | 8/2014 | Pang et al. |
| 2020/0163074 A1 | 5/2020 | Tang et al. |

FOREIGN PATENT DOCUMENTS

| | | |
|---|---|---|
| CN | 108811110 A | 11/2018 |
| CN | 109151869 A | 1/2019 |
| CN | 109302720 A | 2/2019 |
| IN | 201814029763 A | 2/2019 |
| JP | 2012518297 A | 8/2012 |
| WO | 2018143375 A1 | 8/2018 |
| WO | 2018204863 A1 | 11/2018 |
| WO | 2018237167 A1 | 12/2018 |
| WO | 2019020035 A1 | 1/2019 |
| WO | 2019160342 A1 | 8/2019 |

OTHER PUBLICATIONS

Huawei et al., "Discussion on beam management aspects for DL MIMO", 3GPP TSG RAN WG1 Meeting #87, R1-1611670, Nov. 14-18, 2016, 7 pages, Reno, USA.

3rd Generation Partnership Project; Technical Specification Group Radio Access Network; NR; Medium Access Control (MAC) protocol specification (Release 15), 3GPP TS 38.321 V15.4.0 (Dec. 2018), 77 pages.

3rd Generation Partnership Project; Technical Specification Group Radio Access Network; NR; Radio Resource Control (RRC) protocol specification (Release 15), 3GPP TS 38.331 V15.4.0 (Dec. 2018), 474 pages.

Xiaomi Communications, Consideration on MDT in NR. 3GPP TSG-RAN2 #105bis, Xi'an, China Apr. 8-12, 2019, R2-1903670, 3 pages.

Ericsson, RACH optimization in NR. 3GPP TSG-RAN WG2 #105, Athens, Greece, Feb. 25-Mar. 1, 2019, R2-1900658, 7 pages.

\* cited by examiner

COMMUNICATION METHOD, APPARATUS, AND SYSTEM

CROSS-REFERENCE TO RELATED APPLICATIONS

This application is a continuation of International Application No. PCT/CN2020/080454, filed on Mar. 20, 2020, which claims priority to Chinese Patent Application 201910252536.5, filed on Mar. 29, 2019. The disclosures of the aforementioned applications are hereby incorporated by reference in their entireties.

TECHNICAL FIELD

This application relates to the communications field, and more specifically, to a communication method, apparatus, and system.

BACKGROUND

A random access procedure is a first procedure that needs to be executed when user equipment (UE) accesses a network. A configuration parameter used in the random access procedure greatly affects random access performance and system performance.

The random access configuration parameter determines a random access collision probability. The random access collision probability is also a key factor affecting a call setup latency, an uplink out-of-synchronization recovery latency, and a handover latency. The random access collision probability also affects a call setup success rate and a handover success rate. At the same time, an inappropriate random access configuration parameter may cause a relatively low preamble detection rate, and even a limited system coverage problem. Therefore, optimizing the random access configuration parameter is advantageous for improving network performance. In addition, if network configuration is changed, for example, an antenna tilt is adjusted, cell transmit power is changed, or a handover threshold is optimized, the original random access configuration parameter may be inappropriate.

Therefore, how to optimize the random access configuration parameter becomes an urgent problem to be resolved.

SUMMARY

This application provides a communication method, apparatus, and system, to optimize a configuration parameter used in a random access procedure.

According to a first aspect, a communication method is provided. The method includes: determining first information, where the first information includes one or more types of information about an associated beam for a random access success of the terminal device, information about an associated uplink carrier for a random access success of the terminal device, or information about an associated bandwidth part BWP for a random access success of the terminal device, and/or includes information about a random access channel RACH resource for a random access failure of the terminal device, and the random access failure of the terminal device includes one or more of a 2-step random access failure, a 4-step random access failure, a dedicated random access channel RACH resource random access failure, or a common RACH resource random access failure; and sending the first information.

According to the communication method in this embodiment of this application, the first information is sent to a network device. The first information includes the one or more of the information about the associated beam for the random access success of the terminal device, the information about the associated uplink carrier for the random access success of the terminal device, or the information about the associated bandwidth part BWP for the random access success of the terminal device, and/or the first information includes the information about the random access channel RACH resource for the random access failure of the terminal device. Therefore, the network device can optimize, based on the first information, a configuration parameter used for random access.

Optionally, before the determining first information, the method further includes: receiving second information, where the second information is used to request the first information.

Optionally, before the receiving second information, the method further includes: sending third information, where the third information is used to indicate that the information about the associated beam for the random access success of the terminal device does not meet a first threshold, the third information is used to indicate that the information about the associated uplink carrier for the random access success of the terminal device does not meet a second threshold, and/or the third information is used to indicate that the information about the associated BWP for the random access success of the terminal device does not meet a third threshold.

Optionally, the associated beam includes a synchronization signal block SSB and/or a channel state information reference signal CSI-RS. The information about the associated beam includes one or more of the following: a signal to interference plus noise ratio SINR of the SSB, an SINR of the CSI-RS, reference signal received power RSRP of the SSB, RSRP of the CSI-RS, reference signal received quality RSRQ of the SSB, and RSRQ of the CSI-RS.

Optionally, the associated uplink carrier includes a normal uplink carrier and/or a supplementary uplink carrier. The information about the associated uplink carrier includes one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the information about the associated BWP includes one or more of the following: an SINR of the associated BWP, RSRP of the associated BWP, and RSRQ of the associated BWP.

Optionally, the information about the RACH resource for the random access failure of the terminal device includes one or more of the following: information about an associated beam, information about an associated uplink carrier, information about an associated BWP, a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

Optionally, the information about the RACH resource further includes fallback indication information. The fallback indication information is used to indicate the terminal device to fall back from 2-step random access to 4-step random access, and/or the fallback indication information is used to indicate that a RACH resource used by the terminal device for the random access is fallen back from a dedicated RACH resource to a common RACH resource.

Optionally, the method further includes: receiving fourth information, where the fourth information includes an optimized configuration parameter used for random access.

Optionally, the optimized configuration parameter used for the random access includes one or more of the first threshold, the second threshold, the third threshold, or the RACH resource.

Optionally, a network device includes a centralized unit CU and a distributed unit DU, and the sending the first information includes: sending the first information to the DU.

According to a second aspect, a communication method is provided. The method includes: receiving first information, where the first information includes one or more types of information about an associated beam for a random access success of the terminal device, information about an associated uplink carrier for a random access success of the terminal device, or information about an associated bandwidth part BWP for a random access success of the terminal device, and/or includes information about a random access channel RACH resource for a random access failure of the terminal device, and the random access failure of the terminal device includes one or more of a 2-step (2-step) random access failure, a 4-step (4-step) random access failure, a dedicated random access channel RACH resource random access failure, or a common RACH resource random access failure; and optimizing, based on the first information, a configuration parameter used for random access.

According to the communication method in this embodiment of this application, a network device receives the first information sent by the terminal device. The first information includes the one or more of the information about the associated beam for the random access success of the terminal device, the information about the associated uplink carrier for the random access success of the terminal device, or the information about the associated bandwidth part BWP for the random access success of the terminal device, and/or the first information includes the information about the random access channel RACH resource for the random access failure of the terminal device. Therefore, the network device can optimize, based on the first information, the configuration parameter used for the random access.

Optionally, before the receiving first information, the method further includes: sending second information, where the second information is used to request the first information.

Optionally, before the sending second information, the method further includes: receiving third information, where the third information is used to indicate that the information about the associated beam for the random access success of the terminal device does not meet a first threshold, the third information is used to indicate that the information about the associated uplink carrier for the random access success of the terminal device does not meet a second threshold, and/or the third information is used to indicate that the information about the associated BWP for the random access success of the terminal device does not meet a third threshold.

Optionally, the associated beam includes a synchronization signal block SSB and/or a channel state information reference signal CSI-RS. The information about the associated beam includes one or more of the following: a signal to interference plus noise ratio SINR of the SSB, an SINR of the CSI-RS, reference signal received power RSRP of the SSB, RSRP of the CSI-RS, reference signal received quality RSRQ of the SSB, and RSRQ of the CSI-RS.

Optionally, the associated uplink carrier includes a normal uplink carrier and/or a supplementary uplink carrier. The information about the associated uplink carrier includes one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the information about the associated BWP includes one or more of the following: an SINR of the associated BWP, RSRP of the associated BWP, and RSRQ of the associated BWP.

Optionally, the information about the RACH resource for the random access failure of the terminal device includes one or more of the following: information about an associated beam, information about an associated uplink carrier, information about an associated BWP, a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

Optionally, the information about the RACH resource further includes fallback indication information. The fallback indication information is used to indicate the terminal device to fall back from 2-step random access to 4-step random access, and/or the fallback indication information is used to indicate that a RACH resource used by the terminal device for the random access is fallen back from a dedicated RACH resource to a common RACH resource.

Optionally, the optimizing, based on the first information, a configuration parameter used for random access includes: adjusting the first threshold based on the information about the associated beam for the random access success of the terminal device; adjusting the second threshold based on the information about the associated uplink carrier for the random access success of the terminal device; and/or adjusting the third threshold based on the information about the associated BWP for the random access success of the terminal device.

Optionally, the optimizing, based on the first information, a configuration parameter used for random access includes: adjusting the RACH resource based on the information about the RACH resource for the random access failure of the terminal device.

Optionally, the method further includes: sending fourth information, where the fourth information includes an optimized configuration parameter used for the random access.

Optionally, the optimized configuration parameter used for the random access includes one or more of the first threshold, the second threshold, the third threshold, or the RACH resource.

Optionally, a network device includes a centralized unit CU and a distributed unit DU, and the optimizing, based on the first information, a configuration parameter used for random access includes: The CU optimizes, based on the first information, the configuration parameter used for the random access; or the DU optimizes, based on the first information, the configuration parameter used for the random access.

Optionally, the receiving first information includes: The DU receives the first information.

According to a third aspect, a communication method is provided. The method includes: sending third information, where the third information is used to indicate that information about an associated beam for a random access success of the terminal device does not meet a first threshold, the third information is used to indicate that information about an associated uplink carrier for a random access success of the terminal device does not meet a second threshold, and/or the third information is used to indicate that information about an associated BWP for a random access success of the terminal device does not meet a third threshold.

Optionally, the method further includes: determining first information, where the first information includes one or more of the information about the associated beam for the random access success of the terminal device, the information about the associated uplink carrier for the random access success of the terminal device, or the information about the associated bandwidth part BWP for the random access success of the terminal device, and/or includes information about a random access channel RACH resource for a random access failure of the terminal device, and the random access failure of the terminal device includes one or more of a 2-step random access failure, a 4-step random access failure, a dedicated random access channel RACH resource random access failure, or a common RACH resource random access failure; and sending the first information.

Optionally, the method further includes: receiving second information, where the second information is used to request the first information.

Optionally, the associated beam includes a synchronization signal block SSB and/or a channel state information reference signal CSI-RS. The information about the associated beam includes one or more of the following: a signal to interference plus noise ratio SINR of the SSB, an SINR of the CSI-RS, reference signal received power RSRP of the SSB, RSRP of the CSI-RS, reference signal received quality RSRQ of the SSB, and RSRQ of the CSI-RS.

Optionally, the associated uplink carrier includes a normal uplink carrier and/or a supplementary uplink carrier. The information about the associated uplink carrier includes one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the information about the associated BWP includes one or more of the following: an SINR of the associated BWP, RSRP of the associated BWP, and RSRQ of the associated BWP.

Optionally, the information about the RACH resource for the random access failure of the terminal device includes one or more of the following: information about an associated beam, information about an associated uplink carrier, information about an associated BWP, a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

Optionally, the information about the RACH resource further includes fallback indication information. The fallback indication information is used to indicate the terminal device to fall back from 2-step random access to 4-step random access, and/or the fallback indication information is used to indicate that a RACH resource used by the terminal device for the random access is fallen back from a dedicated RACH resource to a common RACH resource.

Optionally, the method further includes: receiving fourth information, where the fourth information includes an optimized configuration parameter used for random access.

Optionally, the optimized configuration parameter used for the random access includes one or more of the first threshold, the second threshold, the third threshold, or the RACH resource.

Optionally, a network device includes a centralized unit CU and a distributed unit DU, and the sending the first information includes: sending the first information to the DU.

According to a fourth aspect, a communication method is provided. The method includes: before the sending second information, the method further includes: receiving third information, where the third information is used to indicate that information about an associated beam for a random access success of the terminal device does not meet a first threshold, the third information is used to indicate that information about an associated uplink carrier for a random access success of the terminal device does not meet a second threshold, and/or the third information is used to indicate that information about an associated BWP for a random access success of the terminal device does not meet a third threshold.

Optionally, the method further includes: receiving first information, where the first information includes one or more of the information about the associated beam for the random access success of the terminal device, the information about the associated uplink carrier for the random access success of the terminal device, or the information about the associated bandwidth part BWP for the random access success of the terminal device, and/or includes information about a random access channel RACH resource for a random access failure of the terminal device, and the random access failure of the terminal device includes one or more of a 2-step random access failure, a 4-step random access failure, a dedicated random access channel RACH resource random access failure, or a common RACH resource random access failure; and optimizing, based on the first information, a configuration parameter used in random access.

Optionally, the method further includes: sending the second information, where the second information is used to request the first information.

Optionally, the associated beam includes a synchronization signal block SSB and/or a channel state information reference signal CSI-RS. The information about the associated beam includes one or more of the following: a signal to interference plus noise ratio SINR of the SSB, an SINR of the CSI-RS, reference signal received power RSRP of the SSB, RSRP of the CSI-RS, reference signal received quality RSRQ of the SSB, and RSRQ of the CSI-RS.

Optionally, the associated uplink carrier includes a normal uplink carrier and/or a supplementary uplink carrier. The information about the associated uplink carrier includes one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the information about the associated BWP includes one or more of the following: an SINR of the associated BWP, RSRP of the associated BWP, and RSRQ of the associated BWP.

Optionally, the information about the RACH resource for the random access failure of the terminal device includes one or more of the following: information about an associated beam, information about an associated uplink carrier, information about an associated BWP, a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

Optionally, the information about the RACH resource further includes fallback indication information. The fallback indication information is used to indicate the terminal device to fall back from 2-step random access to 4-step random access, and/or the fallback indication information is used to indicate that a RACH resource used by the terminal device for the random access is fallen back from a dedicated RACH resource to a common RACH resource.

Optionally, the optimizing, based on the first information, a configuration parameter used for random access includes: adjusting the first threshold based on the information about the associated beam for the random access success of the terminal device; adjusting the second threshold based on the information about the associated uplink carrier for the random access success of the terminal device; and/or adjusting the third threshold based on the information about the associated BWP for the random access success of the terminal device.

Optionally, the optimizing, based on the first information, a configuration parameter used for random access includes: adjusting the RACH resource based on the information about the RACH resource for the random access failure of the terminal device.

Optionally, the method further includes: sending fourth information, where the fourth information includes an optimized configuration parameter used for the random access.

Optionally, the optimized configuration parameter used for the random access includes one or more of the first threshold, the second threshold, the third threshold, or the RACH resource.

Optionally, a network device includes a centralized unit CU and a distributed unit DU, and the optimizing, based on the first information, a configuration parameter used for random access includes: The CU optimizes, based on the first information, the configuration parameter used for the random access; or the DU optimizes, based on the first information, the configuration parameter used for the random access.

Optionally, the receiving first information includes: The DU receives the first information.

According to a fifth aspect, a communications apparatus is provided. The apparatus includes: a processing unit, configured to determine first information, where the first information includes one or more types of information about an associated beam for a random access success of the communications apparatus, information about an associated uplink carrier for a random access success of the communications apparatus, or information about an associated bandwidth part BWP for a random access success of the communications apparatus, and/or includes information about a random access channel RACH resource for a random access failure of the communications apparatus, and the random access failure of the communications apparatus includes one or more of a 2-step random access failure, a 4-step random access failure, a dedicated random access channel RACH resource random access failure, or a common RACH resource random access failure; and a sending unit, configured send the first information.

According to the communications apparatus in this embodiment of this application, the first information is sent to a network device. The first information includes the one or more of the information about the associated beam for the random access success of the communications apparatus, the information about the associated uplink carrier for the random access success of the communications apparatus, or the information about the associated bandwidth part BWP for the random access success of the communications apparatus, and/or the first information includes the information about the random access channel RACH resource for the random access failure of the communications apparatus. Therefore, the network device can optimize, based on the first information, a configuration parameter used for random access.

Optionally, the apparatus further includes a receiving unit, configured to receive second information, where the second information is used to request the first information.

Optionally, the sending unit is further configured to send third information, where the third information is used to indicate that the information about the associated beam for the random access success of the communications apparatus does not meet a first threshold, the third information is used to indicate that the information about the associated uplink carrier for the random access success of the communications apparatus does not meet a second threshold, and/or the third information is used to indicate that the information about the associated BWP for the random access success of the communications apparatus does not meet a third threshold.

Optionally, the associated beam includes a synchronization signal block SSB and/or a channel state information reference signal CSI-RS. The information about the associated beam includes one or more of the following: a signal to interference plus noise ratio SINR of the SSB, an SINR of the CSI-RS, reference signal received power RSRP of the SSB, RSRP of the CSI-RS, reference signal received quality RSRQ of the SSB, and RSRQ of the CSI-RS.

Optionally, the associated uplink carrier includes a normal uplink carrier and/or a supplementary uplink carrier. The information about the associated uplink carrier includes one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the information about the associated BWP includes one or more of the following: an SINR of the associated BWP, RSRP of the associated BWP, and RSRQ of the associated BWP.

Optionally, the information about the RACH resource for the random access failure of the communications apparatus includes one or more of the following: information about an associated beam, information about an associated uplink carrier, information about an associated BWP, a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

Optionally, the information about the RACH resource further includes fallback indication information. The fallback indication information is used to indicate the communications apparatus to fall back from 2-step random access to 4-step random access, and/or the fallback indication information is used to indicate that a RACH resource used by the communications apparatus for the random access is fallen back from a dedicated RACH resource to a common RACH resource.

Optionally, the receiving unit is further configured to receive fourth information, where the fourth information includes an optimized configuration parameter used for random access.

Optionally, the optimized configuration parameter used for the random access includes one or more of the first threshold, the second threshold, the third threshold, or the RACH resource.

Optionally, a network device includes a centralized unit CU and a distributed unit DU. The sending unit belongs to the CU. The sending unit is further configured to send the first information to the DU.

According to a sixth aspect, a communications apparatus is provided. The apparatus includes: a receiving unit, configured to receive first information, where the first information includes one or more types of information about an associated beam for a random access success of the terminal device, information about an associated uplink carrier for a random access success of the terminal device, or information about an associated bandwidth part BWP for a random access success of the terminal device, and/or includes information about a random access channel RACH resource for a random access failure of the terminal device, and the random access failure of the terminal device includes one or more of a 2-step random access failure, a 4-step random access failure, a dedicated random access channel RACH resource random access failure, or a common RACH resource random access failure; and a processing unit, configured to optimize, based on the first information, a configuration parameter used for random access.

According to the communication method in this embodiment of this application, the communications apparatus receives the first information sent by the terminal device. The first information includes the one or more of the information about the associated beam for the random access success of the terminal device, the information about the associated uplink carrier for the random access success of the terminal device, or the information about the associated bandwidth part BWP for the random access success of the terminal device, and/or the first information includes the information about the random access channel RACH resource for the random access failure of the terminal device. Therefore, the communications apparatus can optimize, based on the first information, the configuration parameter used for the random access.

Optionally, the apparatus further includes a sending unit, configured to send second information. The second information is used to request the first information.

Optionally, the receiving unit is further configured to receive third information, where the third information is used to indicate that the information about the associated beam for the random access success of the terminal device does not meet a first threshold, the third information is used to indicate that the information about the associated uplink carrier for the random access success of the terminal device does not meet a second threshold, and/or the third information is used to indicate that the information about the associated BWP for the random access success of the terminal device does not meet a third threshold.

Optionally, the associated beam includes a synchronization signal block SSB and/or a channel state information reference signal CSI-RS. The information about the associated beam includes one or more of the following: a signal to interference plus noise ratio SINR of the SSB, an SINR of the CSI-RS, reference signal received power RSRP of the SSB, RSRP of the CSI-RS, reference signal received quality RSRQ of the SSB, and RSRQ of the CSI-RS.

Optionally, the associated uplink carrier includes a normal uplink carrier and/or a supplementary uplink carrier. The information about the associated uplink carrier includes one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the information about the associated BWP includes one or more of the following: an SINR of the associated BWP, RSRP of the associated BWP, and RSRQ of the associated BWP.

Optionally, the information about the RACH resource for the random access failure of the terminal device includes one or more of the following: information about an associated beam, information about an associated uplink carrier, information about an associated BWP, a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

Optionally, the information about the RACH resource further includes fallback indication information. The fallback indication information is used to indicate the terminal device to fall back from 2-step random access to 4-step random access, and/or the fallback indication information is used to indicate that a RACH resource used by the terminal device for the random access is fallen back from a dedicated RACH resource to a common RACH resource.

Optionally, the processing unit is specifically configured to: adjust the first threshold based on the information about the associated beam for the random access success of the terminal device; adjust the second threshold based on the information about the associated uplink carrier for the random access success of the terminal device; and/or adjust the third threshold based on the information about the associated BWP for the random access success of the terminal device.

Optionally, the processing unit is specifically configured to adjust the RACH resource based on the information about the RACH resource for the random access failure of the terminal device.

Optionally, the sending unit is further configured to send fourth information, where the fourth information includes an optimized configuration parameter used for the random access.

Optionally, the optimized configuration parameter used for the random access includes one or more of the first threshold, the second threshold, the third threshold, or the RACH resource.

Optionally, the communications apparatus includes a centralized unit CU and a distributed unit DU. The processing unit belongs to the CU. The processing unit is specifically configured to optimize, based on the first information, the configuration parameter used for the random access. Alternatively, the processing unit belongs to the DU. The processing unit is specifically configured to optimize, based on the first information, the configuration parameter used for the random access.

Optionally, the receiving unit belongs to the DU. The receiving unit is specifically configured to receive the first information.

In a possible design, the apparatus includes one or more processors and a communications unit. The one or more processors are configured to support the apparatus in performing corresponding functions of the terminal device in the foregoing methods. For example, the one or more processors are configured to determine first information. The communications unit is configured to support the apparatus in communicating with another device, to implement a receiving function and/or a sending function. For example, the communications unit is configured to send the first information.

Optionally, the apparatus may further include one or more memories. The memory is coupled to the processor, and the memory stores a program instruction and/or data that are/is necessary for a network device. The one or more memories may be integrated with the processor, or may be disposed independent of the processor. This is not limited in this application.

The apparatus may be an intelligent terminal, a wearable device, or the like. The communications unit may be a transceiver or a transceiver circuit. Optionally, the transceiver may alternatively be an input/output circuit or an interface.

The apparatus may alternatively be a communications chip. The communications unit may be an input/output circuit or interface of the communications chip.

In another possible design, the apparatus includes a transceiver, a processor, and a memory. The processor is configured to control the transceiver to receive and send a signal. The memory is configured to store a computer program. The processor is configured to run a computer program in the memory, so that the apparatus performs the method performed by the terminal device in any one of the first aspect or the possible implementations of the first aspect.

In a possible design, the apparatus includes one or more processors and a communications unit. The one or more processors are configured to support the apparatus in performing corresponding functions of the network device in the foregoing methods. For example, the one or more processors are configured to determine a configuration parameter. The communications unit is configured to support the apparatus in communicating with another device, to implement a receiving function and/or a sending function. For example, the communications unit is configured to receive the first information.

Optionally, the apparatus may further include one or more memories. The memory is coupled to the processor, and the memory stores a program instruction and/or data that are/is necessary for the apparatus. The one or more memories may be integrated with the processor, or may be disposed independent of the processor. This is not limited in this application.

The apparatus may be a base station, a gNB, a TRP, or the like. The communications unit may be a transceiver or a transceiver circuit. Optionally, the transceiver may alternatively be an input/output circuit or an interface.

The apparatus may alternatively be a communications chip. The communications unit may be an input/output circuit or interface of the communications chip.

In another possible design, the apparatus includes a transceiver, a processor, and a memory. The processor is configured to control the transceiver to receive and send a signal. The memory is configured to store a computer program. The processor is configured to run the computer program in the memory, so that the apparatus performs the method performed by the network device in any one of the second aspect or the possible implementations of the second aspect.

According to a seventh aspect, a system is provided. The system includes the foregoing network device. Optionally, the system further includes the foregoing terminal device.

According to an eighth aspect, a readable storage medium is provided and is configured to store a program. The program includes an instruction used to perform the method according to any one of the first aspect or the possible implementations of the first aspect.

According to a ninth aspect, a readable storage medium is provided and is configured to store a program. The program includes an instruction used to perform the method according to any one of the second aspect or the possible implementations of the second aspect.

According to a tenth aspect, a program product is provided. The program product includes program code. When the program code is run on one or more processors, the one or more processors are enabled to perform the method in any one of the first aspect or the possible implementations of the first aspect.

According to an eleventh aspect, a program product is provided. The program product includes program code. When the program code is run on one or more processors, the one or more processors are enabled to perform the method in any one of the second aspect or the possible implementations of the second aspect.

According to the communication method in the embodiments of this application, the first information is sent to the network device. The first information includes the one or more of the information about the associated beam for the random access success of the terminal device, the information about the associated uplink carrier for the random access success of the terminal device, or the information about the associated bandwidth part BWP for the random access success of the terminal device, and/or the first information includes the information about the random access channel RACH resource for the random access failure of the terminal device. Therefore, the network device can optimize, based on the first information, the configuration parameter used for the random access.

DETAILED DESCRIPTION OF ILLUSTRATIVE EMBODIMENTS

Figure 1:
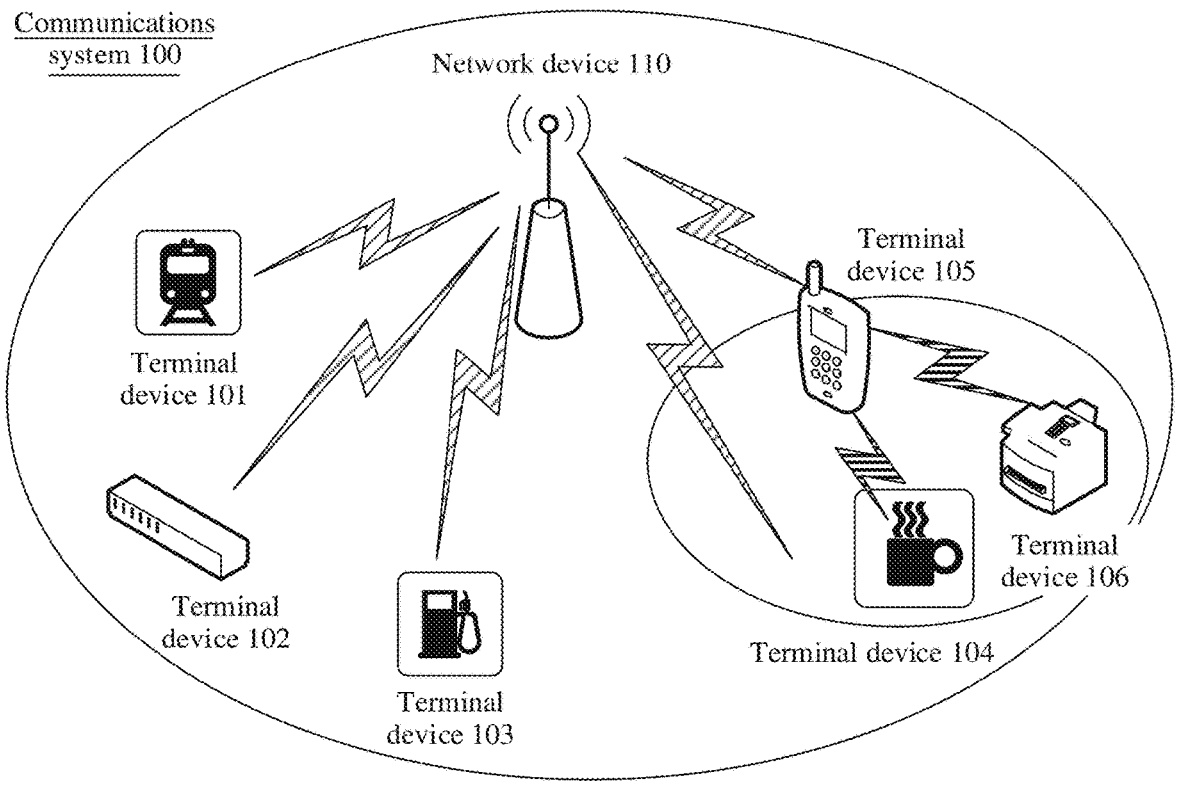
FIG. 1 is a schematic diagram of an application scenario of a technical solution according to an embodiment of this application.

The following describes technical solutions of this application with reference to accompanying drawings.

The technical solutions of embodiments of this application may be applicable to various communications systems, such as, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a 5th generation (5G) system, or new radio (NR).

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

As an example instead of a limitation, in the embodiments of this application, the terminal device may alternatively be a wearable device. The wearable device may also be referred to as a wearable intelligent device, and is a general term for wearable devices, such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, or smart jewelry for monitoring physical signs.

In addition, the terminal device in the embodiments of this application may alternatively be a terminal device in an internet of things (IoT) system. IoT is an important part of future development of information technologies. A main technical feature of the IoT is connecting a thing to a network by using a communications technology, to implement an intelligent network for interconnection between a person and a machine or between one thing and another. In the embodiments of this application, an IoT technology may implement massive connections, deep coverage, and terminal power saving by using, for example, a narrowband (narrow band) NB technology.

In addition, in the embodiments of this application, the terminal device may alternatively include a sensor such as an intelligent printer, a train detector, or a gas station. Main functions of the terminal device include collecting data (for some terminal devices), receiving control information and downlink data from a network device, sending an electromagnetic wave, and sending uplink data to a network device.

A network device in the embodiments of this application may be a device, such as an access network, configured to communicate with the terminal device.

As an example instead of a limitation, the network device in this application may be an access point (AP) in a WLAN, may be a base transceiver station (BTS) in a global system for mobile communications (GSM) system or code division multiple access (CDMA), may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In addition, in the embodiments of this application, an access network device serves a cell. The terminal device communicates with the access network device on a transmission resource (for example, a frequency domain resource, namely, a spectrum resource) used for the cell. The cell may be a cell corresponding to the access network device (for example, a base station). The cell may belong to a macro base station, or a base station corresponding to a small cell (small cell). The small cell herein may include a metro cell, a micro cell, a pico cell, a femto cell, or the like. These small cells have features of small coverage and low transmit power, and are suitable for providing a high-rate data transmission service.

In this application, the network device may include a gNB, for example, a macro base station, a micro base station, an indoor hotspot, or a relay node, and has functions of: sending a radio wave to the terminal device to implement downlink data transmission on one hand and send scheduling information to control uplink transmission on the other hand; and receiving a radio wave sent by the terminal device to receive uplink data transmission.

The foregoing listed functions and specific implementations of the terminal device and the network device are merely examples for description, and this is not limited in this application.

It may be understood that there are different service scenarios in a communications network, and the network device and/or the terminal device may be in corresponding forms in the different service scenarios. This is not limited in this application.

For example, 5G includes three typical service scenarios.

A first scenario is enhanced mobile broadband. In this application scenario, a peak network access rate for an intelligent terminal user needs to reach 10 Gbps or even 20 Gbps, to provide support for high-bandwidth applications, such as virtual reality, ubiquitous video on-live and sharing, and anytime and anywhere cloud access.

A second scenario is big-connection internet of things. In this scenario, a 5G network needs to support 1,000,000 human-things connections per square kilometer.

A third scenario is ultra-reliable and low latency communications. In this scenario, a latency of a 5G network is required to be 1 millisecond, to provide strong support for low-latency services, such as intelligent manufacturing, remote mechanical control, aided driving, and automatic driving.

It should be understood that the technical solutions provided in this application may be applicable to various communications systems, for example, a 5G mobile communications system. The 5G mobile communications system in this application includes a non-standalone (non-standalone, NSA) 5G mobile communications system and/or a standalone (SA) 5G mobile communications system. The technical solutions provided in this application may be further applicable to future communications systems, for example, a sixth generation mobile communications system.

In the embodiments of this application, the terminal device or the network device includes a hardware layer, an operating system layer running above the hardware layer, and an application layer running above the operating system layer. The hardware layer includes hardware, such as a central processing unit (CPU), a memory management unit (MMU), or a memory (also referred to as a main memory). The operating system may be any one or more computer operating systems that implement service processing by using a process. For example, the operating system is a Linux operating system, a Unix operating system, an Android operating system, an iOS operating system, a Windows operating system, or the like. The application layer includes applications, such as a browser, an address book, word processing software, and instant communications software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, aspects or features of this application may be implemented as a method, an apparatus or a product that uses standard programming and/or engineering technologies. The term "product" used in this application covers a computer program that can be accessed from any computer readable component, carrier or medium. For example, a computer-readable medium may include but is not limited to a magnetic storage component (for example, a hard disk, a floppy disk, or a magnetic tape), an optical disc (for example, a compact disc (CD), or a digital versatile disc (DVD)), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry an instruction and/or data.

FIG. 1 is an architectural diagram of an example of a communications system 100 to which an embodiment of this application is applicable. A method in the embodiments of this application may be applicable to the communications system 100 shown in FIG. 1. It should be understood that the communications system 100 to which the method in the embodiments of this application may be applicable may include more or fewer network devices or terminal devices.

A network device or a terminal device in FIG. 1 may be hardware, or may be software obtained through functional division, or a combination thereof. The network device or the terminal device in FIG. 1 may communicate with each other by using another device or network element.

In the communications system 100 shown in FIG. 1, a network device 110 and terminal devices 101 to 106 form the communications system 100. In the communications system 100, the network device 110 may send downlink data to the terminal devices 101 to 106. Certainly, the terminal devices 101 to 106 may also send uplink data to the network device 110. It should be understood that each of the terminal devices 101 to 106 may be, for example, a cellular phone, a smartphone, a portable computer, a handheld communications device, a handheld computing device, a satellite radio apparatus, a global positioning system, a PDA, and/or any other appropriate device used for communication in the wireless communications system 100.

The communications system 100 may be a PLMN network, a device-to-device (D2D) network, a machine to machine (M2M) network, an IoT network, or another network.

In addition, the terminal devices 104 to 106 may also form a communications system. In the communications system, a terminal device 105 may send downlink data to a terminal device 104 or a terminal device 106. Correspondingly, the terminal device 104 or the terminal device 106 may also send uplink data to the terminal device 105.

Figure 2:
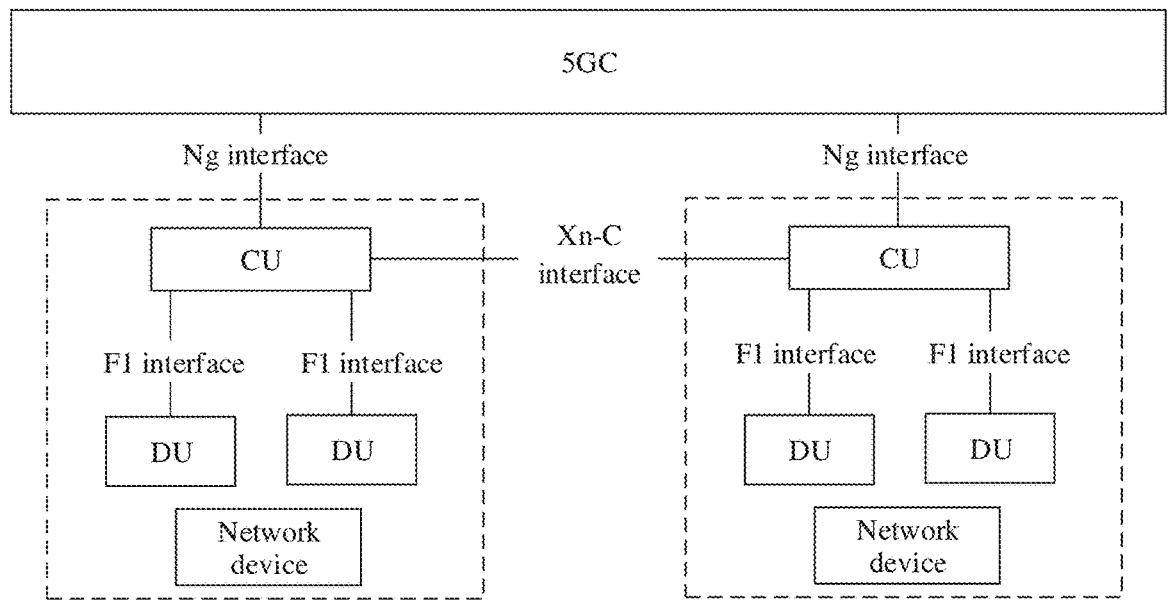
FIG. 2 is a schematic diagram of another application scenario of a technical solution according to an embodiment of this application.

FIG. 2 is a schematic diagram of another application scenario of a technical solution according to an embodiment of this application. In a communications system in FIG. 2, CU-DU division is introduced.

As shown in FIG. 2, one network device may include one CU and at least one DU. In a current 3rd generation partnership project (3GPP), an interface between CUs in different network devices is an Xn-C interface. An interface between the CU and a 5G core network (5GC) is an Ng interface. An interface between the CU and a DU is named an F1 interface. The F1 interface includes a control plane (CP) and a user plane (UP). A transport layer protocol of the control plane is a stream control transmission protocol (SCTP). A transmitted application layer message is an F1AP (application protocol) message. A transport layer protocol of the user plane is a GPRS tunneling protocol of the user plane (GPRS tunneling protocol-user plane, GTP-U).

The CU has radio resource control (RRC) functions or some RRC control functions, and includes all or some protocol layer functions of an existing base station. For example, the CU includes only the RRC functions or some of the RRC functions, includes the RRC functions or service data adaptation protocol (SDAP) layer functions, includes RRC/packet data convergence protocol (PDCP) layer functions, includes RRC/PDCP layer functions and some radio link control (RLC) protocol layer functions, or includes RRC/PDCP/media access control (MAC) layer functions and even some or all physical layer PHY functions. There may be any other possibilities.

The DU has all protocol layer functions except protocol layer functions of the CU, of an existing base station, namely, some RRC/SDAP/PDCP/RLC/MAC/PHY protocol layer function units. For example, the DU includes some RRC functions and PDCP/RLC/MAC/PHY protocol layer functions, includes PDCP/RLC/MAC/PHY protocol layer functions, includes RLC/MAC/PHY protocol layer functions, includes some RLC/MAC/PHY functions, or includes only all or some PHY functions. It should be noted that functions of the protocol layers mentioned herein may change, and all changes fall within the protection scope of this application. For example, the DU has all the protocol layer functions of the existing base station.

For example, functions of a PDCP layer and a protocol layer above the PDCP layer are set on the CU, and functions of protocol layers below the PDCP layer, for example, functions of an RLC layer and a MAC layer, are set on the DU. Certainly, such division into the protocol layers is merely an example, and may alternatively be performed at another protocol layer. For example, the division is performed at the RLC layer. Functions of the RLC layer and a protocol layer above the RLC layer are set on the CU, and functions of a protocol layer below the RLC layer are set on the DU. Alternatively, the division is performed at a protocol layer. For example, some functions of the RLC layer and functions of a protocol layer above the RLC layer are set on the CU, and a remaining function of the RLC layer and functions of a protocol layer below the RLC layer are set on the DU. In addition, the division may alternatively be performed in another manner. For example, the division is performed based on a latency. A function whose processing time needs to meet a latency requirement is set on the DU, and a function whose processing time does not need to meet the latency requirement is set on the CU. In addition, a radio frequency apparatus may be not placed in the DU but is placed remotely from the DU, or may be integrated into the DU, or a part is placed remotely from the DU and a remaining part is integrated into the DU. This is not limited herein.

For another example, in a 5G network, new technical progress is also achieved for a new relay node. For example, a protocol stack architecture including only a layer 2 (for example, including a radio link control (RLC) layer and a MAC layer) and a layer 1 (for example, including a PHY layer) is deployed on the relay node, and none of protocol stack functions above the layer 2, for example, all functions of the RRC layer, is deployed. Therefore, data or signaling generated by a host base station needs to be forwarded to a terminal device by the relay node.

It should be understood that the embodiments of this application may also be applicable to a relay scenario. For example, a DU in a CU-DU architecture may also correspond to the relay node. A CU in a CU-DU architecture may also correspond to the host base station. Alternatively, the embodiments of this application may be further applicable to a scenario in which a DU transmits data with a terminal device by using a relay device.

The technical solutions in the embodiments of this application may alternatively be applicable to a communications system of a CP-UP architecture. For example, a control plane and a user plane of a CU may be separated to obtain a CU control plane (CU-CP) and a CU user plane (CU-UP). In this case, an E1 interface is an interface between the CU-CP and the CU-UP. The CU-UP and a DU are connected through an F1-U. The CU-CP and the DU are connected through an F1-C. The CU-UP and a 5GC are connected through an Ng-U. The CU-CP and the 5GC are connected through an Ng-C.

In the prior art, a network device may configure, for a terminal device, configuration parameters used in a random access procedure. These configuration parameters may include one or a combination of a plurality of a beam, an uplink carrier, a bandwidth part (BWP), and/or a random access channel (RACH) resource.

For example, the beam is used as an example to describe the random access procedure. On a terminal side, during random access, the terminal device may select a beam based on a threshold of a beam configured by the network device. If there is a beam that meets the threshold, the terminal device selects the beam that meets the threshold, to perform the random access. If there is no beam that meets the threshold, the terminal device randomly selects a beam to perform the random access.

However, on a network side, after the terminal device successfully performs the random access, the network device cannot optimize the threshold of the beam used by the terminal device for the random access, and cannot determine whether the beam used by the terminal device for the successful random access meets the threshold.

An inappropriate random access configuration parameter increases a collision probability during the random access, and affects system performance. In addition, network configuration is changed, for example, an antenna tilt is adjusted, cell transmit power is changed, or a handover threshold is optimized, the original random access configuration parameter may be inappropriate. Therefore, how to optimize the random access configuration parameter becomes an urgent problem to be resolved.

Based on the foregoing problem, embodiments of this application provide a communication method, to optimize a configuration parameter used in a random access procedure.

Figure 3:
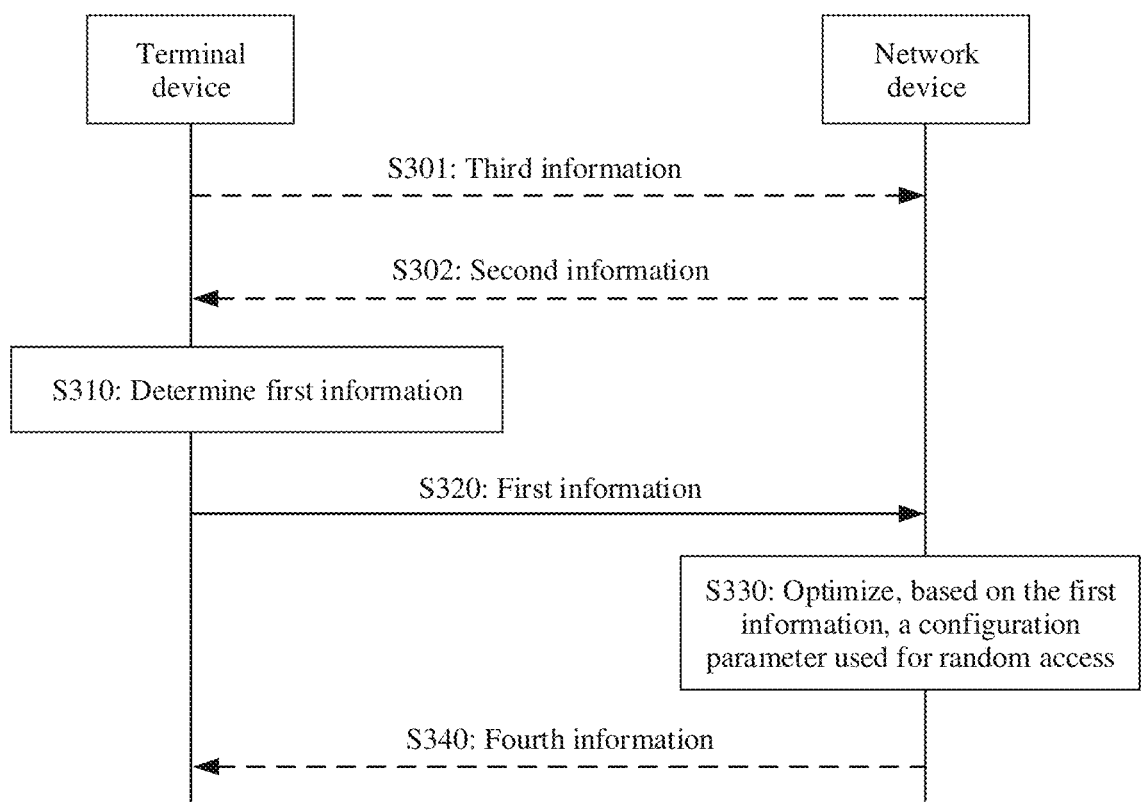
FIG. 3 is a schematic flowchart of a communication method according to an embodiment of this application.

FIG. 3 is a schematic flowchart of a communication method 300 according to an embodiment of this application. It should be understood that FIG. 3 shows steps or operations of the communication method. However, these steps or operations are merely examples. In this embodiment of this application, other operations or variations of the operations in FIG. 3 may be further performed, or not all steps need to be performed. Alternatively, these steps may be performed in other orders.

It should be understood that a network device in the method 300 may be the network device 110 in FIG. 1, or a network device in the method 300 may be the network device in the CU-DU architecture in FIG. 2. As shown in FIG. 2, the network device may include a centralized unit CU and a distributed unit DU.

S310: A terminal device determines first information.

In this embodiment of this application, information included in the first information may be the following several cases.

Case 1:

In a possible implementation, the first information includes one or more types of information about an associated beam for a random access success of the terminal device, information about an associated uplink carrier for a random access success of the terminal device, or information about an associated bandwidth part BWP for a random access success of the terminal device.

Optionally, the one or more types of information included in the first information may be separately reported to the network device, or may be combined and then reported to the network device. Specifically, the one or more types of information may be included in an existing random access report, or the one or more types of information may be included in a new report or message. This is not limited in this embodiment of this application.

For ease of description, in this embodiment of this application, a beam associated with an RACH resource used by the terminal device in a random access procedure is collectively referred to as an associated beam. An uplink carrier associated with the RACH resource used by the terminal device in the random access procedure is collectively referred to as an associated uplink carrier. A BWP associated with the RACH resource used by the terminal device in the random access procedure is collectively referred to as an associated BWP.

It should be understood that the beam associated with the RACH resource used by the terminal device in the random access procedure may alternatively have another name. Likewise, the associated uplink carrier and the associated BWP may have other names. This is not limited in this embodiment of this application.

Optionally, the first information may further include information about an adjacent beam. The adjacent beam may be another beam measured by the terminal device.

The associated beam and/or the adjacent beam in this embodiment of this application may include a synchronization signal block (SSB) and/or a channel state information reference signal (CSI-RS).

Optionally, the information about the associated beam may include a measurement result of the associated beam. The information about the adjacent beam may include a measurement result of the adjacent beam. Optionally, the information about the associated beam may further include identifier information of the associated beam. The information about the adjacent beam may further include identifier information of the adjacent beam.

The measurement result of the associated beam may include signal strength of the associated beam. The measurement result of the adjacent beam may include signal strength of the adjacent beam. The identifier information of the associated beam may be used to distinguish whether the associated beam is an SSB beam and/or a CSI-RS beam. The identifier information of the adjacent beam may be used to distinguish whether the adjacent beam is an SSB beam and/or a CSI-RS beam.

Optionally, the identifier information of the associated beam and/or the identifier information of the adjacent beam may include an SSB identifier and/or a CSI-RS identifier. Further, optionally, the identifier information of the associated beam and/or the identifier information of the adjacent beam may further include an identifier of a cell in which the SSB is located and/or an identifier of a cell in which the CSI-RS is located. The SSB identifier may be used to identify an SSB. For example, the SSB identifier may be an index (index) of the SSB. Likewise, the CSI-RS identifier may be used to identify a CSI-RS. For example, the CSI-RS identifier may be an index of the CSI-RS. Optionally, an identifier of a cell may be physical cell identification (PCI), a cell global identity (CGI), or the like.

Specifically, the signal strength of the associated beam and/or the signal strength of the adjacent beam may include one or more of the following: a signal to interference plus noise ratio (SINR) of the SSB, an SINR of the CSI-RS, reference signal received power (RSRP) of the SSB, RSRP of the CSI-RS, reference signal received quality (RSRQ) of the SSB, and RSRQ of the CSI-RS. The RSRP of the SSB may be RSRP of the SSB, or the RSRP of the SSB may be RSRP of a synchronization signal (SS) corresponding to the SSB. The RSRQ of the SSB may be RSRQ of the SSB, or the RSRQ of the SSB may be RSRQ of the SS corresponding to the SSB. It should be noted that, the RSRP of the SSB may also be represented by SS-RSRP. The SINR of the SSB may also be represented by an SS-SINR. The RSRQ of the SSB may also be represented by SS-RSRQ. The RSRP of the CSI-RS may also be represented by CSI-RSRP. The SINR of the CSI-RS may also be represented by using a CSI-SINR. The RSRQ of the CSI-RS may be represented by using CSI-RSRQ. This is not limited in this application.

Optionally, the first information may further include information about an adjacent uplink carrier. The adjacent uplink carrier may be another uplink carrier measured by the terminal device.

In this embodiment of this application, the associated uplink carrier and/or the adjacent uplink carrier may be classified into a normal uplink (NUL) carrier (which may also be referred to as an uplink (UL) carrier for short) and/or a supplementary uplink (SUL) carrier.

Optionally, the information about the associated uplink carrier may include a measurement result of the associated uplink carrier. The information about the adjacent uplink carrier may include a measurement result of the adjacent uplink carrier. Optionally, the information about the associated uplink carrier may further include identifier information of the associated uplink carrier. The information about the adjacent uplink carrier may further include identifier information of the adjacent uplink carrier. The identifier information of the associated uplink carrier may be used to distinguish whether the associated uplink carrier is the UL carrier or the SUL carrier. The identifier information of the adjacent uplink carrier may be used to distinguish whether the adjacent uplink carrier is the UL carrier or the SUL carrier.

The measurement result of the associated uplink carrier may include signal strength of the associated uplink carrier. The measurement result of the adjacent uplink carrier may include signal strength of the adjacent uplink carrier.

Optionally, the identifier information of the associated uplink carrier and/or the identifier information of the adjacent uplink carrier may include one or more of the following: an identifier of the SUL carrier, a carrier identifier of the SUL carrier, a carrier frequency of the SUL carrier, an identifier of a cell in which the SUL carrier is located, an identifier of the UL carrier, a carrier identifier of the UL carrier, a carrier frequency of the UL carrier, and an identifier of a cell in which the UL carrier is located. An identifier of a cell may be PCI, a CGI, or the like.

Specifically, the signal strength of the associated uplink carrier and/or the signal strength of the adjacent uplink carrier may include one or more of the following: an SINR of the normal uplink carrier, RSRP of the normal uplink carrier, RSRQ of the normal uplink carrier, an SINR of the supplementary uplink carrier, RSRP of the supplementary uplink carrier, and RSRQ of the supplementary uplink carrier.

Optionally, the first information may further include information about an adjacent BWP. The adjacent BWP may be another BWP measured by the terminal device.

Optionally, the information about the associated BWP may include a measurement result of the associated BWP. The information about the adjacent BWP may include a measurement result of the adjacent BWP. Optionally, the information about the associated BWP may further include identifier information of the associated BWP. The information about the adjacent BWP may further include identifier information of the adjacent BWP.

Optionally, the identifier information of the associated BWP and/or the identifier information of the adjacent BWP may include one or more of the following: a BWP identifier, a location and a bandwidth, a sub-bandwidth space domain (subcarrier spacing), and an identifier of a cell in which a BWP is located. The identifier of the cell may be PCI, a CGI, or the like.

Specifically, signal strength of the associated BWP and/or signal strength of the adjacent BWP may include one or more of the following: an SINR of the BWP, RSRP of the BWP, and RSRQ of the BWP.

Optionally, the first information may further include one or more of transmit power of the terminal device when random access succeeds, maximum power indication information, and the like. The maximum power indication information may be used to indicate whether a transmitted preamble reaches a maximum power level.

Case 2:

In another possible implementation, the first information includes information about a RACH resource for a random access failure of the terminal device.

The information about the RACH resource for the random access failure may be collected and reported at a beam level. The information about the RACH resource for the random access failure may further be collected and reported at an uplink carrier level. The information about the RACH resource for the random access failure may alternatively be collected and reported at a BWP level.

Optionally, the first information may further include information about an associated beam used when the terminal device fails to perform random access. In this case, the information about the RACH resource for the random access failure of the terminal device is information about an RACH resource for the random access failure of the terminal device on the associated beam.

Optionally, the first information may further include information about an associated uplink carrier used when the terminal device fails to perform the random access. In this case, the information about the RACH resource for the random access failure of the terminal device is information about an RACH resource for the random access failure of the terminal device on the associated uplink carrier.

Optionally, the first information may further include information about an associated BWP used when the terminal device fails to perform the random access. In this case, the information about the RACH resource for the random access failure of the terminal device is information about an RACH resource for the random access failure of the terminal device on the associated BWP.

Specifically, the information about the associated beam, the information about the associated uplink carrier, and the information about the associated BWP may be described in Case 1. The first information may further include information about an adjacent beam, information about an adjacent uplink carrier, and/or information about an adjacent BWP.

The random access failure of the terminal device may include one or more of a 2-step random access failure, a 4-step random access failure, a dedicated RACH resource random access failure, or a common RACH resource random access failure.

Optionally, the information about the RACH resource for the 2-step random access failure, the information about the RACH resource for the 4-step random access failure, the information about the RACH resource for the dedicated RACH resource random access failure, or the information about the RACH resource for the public RACH resource random access failure may be recorded separately or together, or one or more of these pieces of information are recorded. This is not limited in this application.

Optionally, the information about the RACH resource for the random access failure of the terminal device may include one or more of the following: a preamble resource type, a quantity of preamble attempts (number of preambles sent), preamble information used in a preamble attempt, conflict detection indication (contention detected), load information of a random access channel, load information of a physical uplink shared channel, transmit power of the terminal device, maximum transmit power satisfaction indication information of the terminal device, failure duration information, access latency information, path loss estimation information, backoff time information, or a random access type. The quantity of preamble attempts may be information about a quantity of preamble access attempts in a process in which the terminal device initiates preamble transmission and successfully performs the random access to a network. The conflict indication information may be used to indicate whether contention is resolved, and/or the conflict indication information may be used to indicate whether a preamble conflict is detected. The load information of the random access channel may include physical resource block (PRB) utilization of the random access channel. The load information of the physical uplink shared channel (PUSCH) may include PRB utilization of the physical uplink shared channel. The transmit power of the terminal device may include actual power for transmitting a preamble. The maximum power indication information may be used to indicate whether a transmitted preamble reaches a maximum power level. The failure duration information may be information about a time at which the terminal device performs a random access attempt. The access latency information may be information about a time in the process in which the terminal device initiates the preamble transmission and successfully performs the random access. The path loss estimation information may be path loss information when the terminal device performs the random access attempt. The backoff time information may be information about a delay time of a network backoff control mechanism in a random access procedure.

Optionally, the random access type may include one or more of on demand system information (on demand system information), RRC connection setup, beam failure recovery (BFR), 2-step random access, 4-step random access, dedicated RACH resource random access, and common RACH resource random access. In this embodiment of this application, that the random access failure of the terminal device may include a plurality of the 2-step random access failure, the 4-step random access failure, the dedicated random access channel RACH resource random access failure, or the common RACH resource random access failure may indicate that the terminal device experiences a plurality of random access failures during the random access.

For example, when the random access failure of the terminal device includes the 2-step random access failure and the 4-step random access failure, it may indicate that the terminal device first fails to perform the 2-step random access and then fails to perform the 4-step random access. It should be understood that the description herein is merely an example rather than a limitation.

Case 3:

In another possible implementation, the first information includes one or more types of information about an associated beam for a random access success of the terminal device, information about an associated uplink carrier for a random access success of the terminal device, or information about an associated bandwidth part BWP for a random access success of the terminal device, and the first information includes information about a random access channel RACH resource for a random access failure of the terminal device.

The random access failure of the terminal device may include one or more of a 2-step random access failure, a 4-step random access failure, a dedicated random access channel (RACH) resource random access failure, or a common RACH resource random access failure.

In this case, it may be understood that the terminal device successfully performs random access, but the terminal device experiences a plurality of random access failures before the random access success.

For example, that the first information includes the information about the associated beam for the random access success of the terminal device and the first information includes the information about the random access channel RACH resource for the 2-step random access failure of the terminal device may indicate that the terminal device first fails to perform 2-step random access and then successfully performs random access by using the associated beam. It should be understood that the description herein is merely an example rather than a limitation.

Optionally, the first information may further include one or more types of information about an adjacent beam, information about an adjacent uplink carrier, and/or information about an adjacent BWP.

It should be understood that the first information may alternatively implicitly indicate the one or more of the information about the associated beam for the random access success of the terminal device, the information about the associated uplink carrier for the random access success of the terminal device, or the information about the associated bandwidth part BWP for the random access success of the terminal device, and/or the first information includes the information about the random access channel RACH resource for the random access failure of the terminal device.

For example, correspondences between the first information and the foregoing pieces of information may be set through preconfiguration or a protocol, to indicate one or more types of the foregoing information by using the first information. Optionally, the first information may alternatively be implicitly indicated in another manner. This is not limited in this embodiment of this application.

In this embodiment of this application, the first information may further include fallback indication information.

The fallback indication information may be used to indicate the terminal device to fall back (fallback) from the 2-step random access to 4-step random access. For example, the terminal device first fails to perform the 2-step random access, and then falls back to perform the 4-step random access. Alternatively, the fallback indication information may also indicate that the terminal device does not fall back (fallback) from the 2-step random access to the 4-step random access.

Optionally, the information about the RACH resource for a 2-step RACH random access failure, recorded by UE, may further include one or more types of information about an RACH resource for a random access failure when a 2-step RACH is not fallen back to a 4-step RACH, and information about an RACH resource for a random access failure when a 2-step RACH is fallen back to a 4-step RACH. Further, optionally, when the 2-step RACH is fallen back to the 4-step RACH, the UE may also record the information about the RACH resource for the 2-step RACH random access failure before the fallback and/or information about a RACH resource for a 4-step RACH random access failure after the fallback. For example, the UE records a quantity of preamble attempts when the 2-step RACH is not fallen back to the 4-step RACH as x, and a quantity of preamble attempts when the 2-step RACH is fallen back to the 4-step RACH as y. Further, when the 2-step RACH is fallen back to the 4-step RACH, the UE further separately records a quantity of preamble attempts about the 2-step RACH as y1, and a quantity of preamble attempts after the 2-step RACH that is fallen back to the 4-step RACH as y2.

Optionally, the fallback indication information may be further used to indicate that a RACH resource used by the terminal device for random access falls back from a dedicated RACH resource to a common RACH resource. For example, the terminal device first fails to perform the random access by using the dedicated RACH resource, and then falls back to perform the random access by using the common RACH resource. The fallback indication information is alternatively used to indicate that a RACH resource used by the terminal device for the random access does not fall back from a dedicated RACH resource to a common RACH resource.

Optionally, the information about the RACH resource for the dedicated RACH resource random access failure, recorded by UE, may further include one or more types of information about an RACH resource for a random access failure when a dedicated RACH resource RACH is not fallen back to a common RACH resource RACH, and information about an RACH resource for a random access failure when a dedicated RACH resource RACH is fallen back to a common RACH resource RACH. Further, optionally, when the dedicated RACH resource RACH is fallen back to the common RACH resource RACH, the UE may further record the information about the RACH resource for the dedicated RACH resource RACH random access failure before the fallback and/or information about the RACH resource for a common RACH resource RACH random access failure after the fallback. For example, the UE records a quantity of preamble attempts when the dedicated RACH resource RACH is not fallen back to the common RACH resource RACH as x, and a quantity of preamble attempts when the dedicated RACH resource RACH is fallen back to the common RACH resource RACH as y. Further, when the dedicated RACH resource RACH is fallen back to the common RACH resource RACH, the UE further separately records a quantity of preamble attempts using the dedicated RACH resource RACH before the fallback as y1, and a quantity of preamble attempts using the common RACH resource RACH after the fallback as y2.

Optionally, the fallback indication information may be used to indicate that the terminal device falls back (or does not fall back) from 2-step random access to 4-step random access, and that an RACH resource used by the terminal device for the random access is fallen back (or is not fallen back) from a dedicated RACH resource to a common RACH resource.

S320: The terminal device sends the first information. Correspondingly, the network device receives the first information.

Optionally, the first information may include one or more types of the foregoing information. The one or more types of information may be separately reported to the network device, for example, reported in groups or individually. Alternatively, the one or more types of information may be combined and then reported to the network device. Specifically, the one or more types of information may be included in an existing random access report, the one or more types of information may be included in a new report or message, or a part of the one or more types of information may be included in an existing random access report, and other part of the one or more types of information may be included in a new report or message. This is not limited in this embodiment of this application.

For example, the terminal device may send the first information to the network device by using a message b in the 2-step random access. The terminal device may send the first information to the network device by using a message 4 in the 4-step random access. The terminal device may send the first information to the network device by using a UE information response message. The terminal device may send the first information to the network device by using another existing RRC message. The terminal device may send the first information to the network device by using a MAC layer message or a physical layer message. The terminal device may carry the first information to a data frame by using a data plane, and send the first information to the network device. The terminal device may use the first information as a measurement quantity of the terminal device and send the first information to the network device in a measurement result. The terminal device may send the first information to the network device by using a new RRC message. Alternatively, the terminal device may send the first information to the network device by using another existing message or another newly defined air interface message. This is not limited in this embodiment of this application.

Optionally, the first information may be sent in a periodic trigger manner, an event trigger manner, or a network device request manner. The period triggering may be that the network device pre-configures for the terminal device a period for sending the first information. For example, the period may be that the terminal device sends the first information to the network device at a fixed time interval, or the period may be that the terminal device sends the first information to the network device each time when random access succeeds for a fixed quantity of times. The event triggering may be a trigger event that the network device pre-configures for the terminal device to send the first information. For example, the trigger event may be that the terminal device is connected to a network after the random access success. After the terminal device is successfully connected to the network, the terminal device sends the first information to the network device. The network device request may be that the network device sends request information to request the terminal device to send the first information.

When the first information is sent in the network device request manner, before the step S310 in the method 300, the method may further include a step S302.

S302: The network device sends second information. Correspondingly, the terminal device receives the second information.

The second information may be used to request the first information.

Optionally, the network device may send the second information to the terminal device by using a user equipment information request (UE information request) message. The network device may send the second information to the terminal device by using another existing RRC message. The network device may send the second information to the terminal device by using a new RRC message. The network device may send the second information to the terminal device by using a MAC layer message or a physical layer message. The network device may carry the second information to a data frame by using a data plane, and send the second information to the terminal device. This is not limited in this embodiment of this application.

Optionally, the second information may include type indication. The type indication is a type of the first information requested by the network device. Optionally, the type may include one or more of a beam type, a UL type, a beam failure recovery (BFR) type, a 2-step RACH type, a 4-step RACH type, a dedicated RACH resource type, a common RACH resource type, an on demand system information (ondemandSI) type, or an RRC connection setup type. The beam type may include an SSB type and/or a CSI-RS type. The UL type may include an NUL type and/or an SUL type. The ondemandSI type may further include a message 1 type and/or a message 3 type. A message 1 indicates a random access preamble sending message. The message 3 indicates a scheduled transmission message.

Optionally, the network device may also request a required information type based on a requirement of the network device. For example, when the network device needs information about the beam type, the second information may include indication information about the beam type. In this case, the second information may be used to request the terminal device to send the information about the associated beam and/or the information about the adjacent beam in the step S310. When the network device needs information about the uplink carrier type, the second information may include indication information about an uplink carrier type. In this case, the second information may be used to request the terminal device to send the information about the associated uplink carrier and/or the information about the adjacent uplink carrier in the step S310.

Optionally, the method 300 may further include a step S301.

S301: The terminal device sends third information. Correspondingly, the network device receives the third information.

The third information may be used to indicate whether the information about the associated beam for the random access success of the terminal device meets a first threshold, the third information is used to indicate whether the information about the associated uplink carrier for the random access success of the terminal device meets a second threshold, and/or the third information is used to indicate whether the information about the associated BWP for the random access success of the terminal device meets a third threshold.

Optionally, the first threshold may be used to select a beam whose measurement result (for example, signal strength or power) meets a preset condition, to perform the random access. For example, when the terminal device performs the random access, the terminal device may compare measured signal strength (for example, RSRP) of beams (SSBs and/or CSI-RSs) with the first threshold. If the signal strength of the beams is greater than the first threshold, the terminal device randomly selects one from beams whose signal strength is greater than the first threshold to perform the random access. Otherwise, if the signal strength of the beams is less than the first threshold, the terminal device randomly selects one from all the beams to perform the random access.

Optionally, the second threshold is used to determine whether to use the UL carrier or the SUL carrier to perform the random access. For example, when the terminal device performs the random access, the terminal device may compare measured signal strength (for example, RSRP) with the second threshold. If the measured signal strength is greater than the second threshold, the terminal device may select the UL carrier to perform the random access. Otherwise, the terminal device selects the SUL carrier to perform the random access.

Optionally, the third threshold may be used to select a BWP whose measurement result (for example, signal strength or power) meets a preset condition, to perform the random access. For example, when the terminal device performs the random access, the terminal device may compare measured signal strength (for example, RSRP) of BWPs with the third threshold. If the signal strength of the BWPs is greater than the third threshold, the terminal device selects one from BWPs whose signal strength is greater than the third threshold to perform the random access. Otherwise, if the signal strength of the BWPs is less than the third threshold, the terminal device randomly selects one from all the BWPs to perform the random access.

The first threshold may include a received power threshold (RSRP-SSBthreshold) of the SSB included in the associated beam, and/or the first threshold may include a reference signal received power threshold (RSRP-CSI-RSthreshold) of the CSI-RS included in the associated beam. The second threshold may include a received power threshold (RSRP-thresholdSSB-SUL) of the uplink carrier included in the associated uplink carrier. The third threshold may include a received power threshold of a BWP included in the associated BWP.

The associated beam is used as an example to describe an indication manner of the third information. Optionally, the third information may indicate, by using "0" or "1", whether the associated beam meets the first threshold. For example, "0" may indicate that the associated beam meets the first threshold. "1" may indicate that the associated beam does not meet the first threshold. Indication of the associated uplink carrier and indication of the associated BWP are similar to indication of the associated beam. Details are not described herein.

It should be understood that in this embodiment of this application, the third information may further be indicated in another manner. This is not limited in this application.

Optionally, the third information may include type indication. The type indication is a type of the first information requested by the network device. Optionally, the type may include one or more of a beam type, a SUL type, a beam failure recovery (BFR) type, a 2-step RACH type, a 4-step RACH type, a dedicated RACH resource type, a common RACH resource type, an on demand system information (ondemandSI) type, or an RRC connection setup type. The ondemandSI type may further include the message 1 type and/or the message 3 type.

In this embodiment of this application, a sending manner of the third information may be that the network device pre-configures a trigger event. For example, the network device may send indication to the UE. The indication is used to indicate that the terminal device sends the third information when the terminal device is connected to the network after the random access success. Alternatively, a sending manner of the third information may be defined by using a protocol. For example, the protocol may be used to predefine that the terminal device sends the third information when the terminal device is connected to the network after the random access success. This is not limited in this embodiment of this application.

S330: The network device optimizes, based on the first information, a configuration parameter used for the random access.

Optionally, the optimized configuration parameter used for the random access may include one or more of the first threshold, the second threshold, the third threshold, or the RACH resource.

Optionally, the network device may adjust the first threshold based on the information about the associated beam for the random access success of the terminal device; the network device may adjust the second threshold based on the information about the associated uplink carrier for the random access success of the terminal device; and/or the network device may adjust the third threshold based on the information about the associated BWP for the random access success of the terminal device.

The first threshold may include the received power threshold (RSRP-SSBthreshold) of the SSB included in the associated beam, and/or the first threshold may include the reference signal received power threshold (RSRP-CSI-RSthreshold) of the CSI-RS included in the associated beam. The second threshold may include the received power threshold (RSRP-thresholdSSB-SUL) of the uplink carrier included in the associated uplink carrier. The third threshold may include the received power threshold of the BWP included in the associated BWP.

It should be noted that, a 2-step RACH process, a 4-step RACH process, a dedicated RACH resource RACH process, and a common RACH resource RACH process each may have thresholds (which may be independent from each other, and values may be the same or different). In other words, each of the processes has a first threshold, a second threshold, or a third threshold. Therefore, optimization of these thresholds needs to be performed independently.

The optimization of these thresholds is described by using the received power threshold of the SSB included in the associated beam as an example.

For example, the first information received by the network device includes the signal strength of the associated beam. If the signal strength of the associated beam is less than a pre-configured threshold (RSRP-thresholdSSB), the network device may decrease the threshold. If the signal strength of the associated beam is greater than the pre-configured threshold, the network device may increase the threshold.

Optionally, the first information may further include an identifier of a beam and an identifier of a cell.

Optionally, the first information may further include the signal strength of the adjacent beam, to assist a base station in adjusting the threshold. For example, if the signal strength of the associated beam is less than the pre-configured threshold, and most signal strength of adjacent beams is less than the signal strength of the associated beam, the network device needs to greatly reduce the threshold. If the signal strength of the associated beam is higher than the pre-configured threshold, and most signal strength of adjacent beams is higher than the signal strength of the associated beam, the network device needs to greatly increase the threshold. Optimization of the beam CSI-RS threshold is similar to optimization of the uplink carrier threshold. Details are not described herein.

It should be understood that the foregoing method for optimizing the threshold is merely an example rather than a limitation.

Optionally, the network device may adjust the RACH resource based on the information about the RACH resource for the random access failure of the terminal device.

The RACH resource may include one or more of a RACH resource used for the 2-step random access, a RACH resource used for the 4-step random access, a dedicated RACH resource, and a common RACH resource.

Optimization of the RACH resources is described by using the RACH resource used in the 2-step random access as an example.

For example, the network device may collect, based on the quantity of preamble attempts about the 2-step RACH in the first information, or the network device may collect, based on the preamble information used in the preamble attempt in the first information, a quantity of preamble attempts about the RACH resource for the 2-step random access (the network device allocates different preambles to the 2-step random access and the 4-step random access. Therefore, the network device may determine, based on the preamble information used in the preamble attempt in the first information, whether the preamble is a 2-step random access preamble or a 4-step random access preamble, to collect the quantity of attempts). Then, the network device may determine whether the quantity of attempts exceeds a threshold. If the quantity of attempts exceeds the threshold, it is considered that the random access preamble is insufficient, and a random access preamble is added.

Alternatively, the network device may determine, based on the conflict detection indication (true or false) in the first information, whether a preamble conflict occurs. If the indication is true, it is considered that the random access preamble is insufficient, and a random access preamble is added.

Alternatively, the network device may determine, based on the path loss estimation information in the first information, whether a path loss is less than a threshold. If the path loss is less than a threshold, a preamble in a random access preamble group B may be insufficient. Correspondingly, the network device may add a preamble in the random access preamble group B.

For another example, the network device may determine, based on the load information of the random access channel and/or the load information of the physical uplink shared channel in the first information, whether loads/a load of the random access channel and/or the physical uplink shared channel are/is excessively high. If the load is relatively high, the PRACH configuration index may be reduced. Otherwise, the PRACH configuration index may be increased. Alternatively, the network device may determine, based on the access latency information in the first information, whether an access latency is excessively long. If the access latency is relatively long, the PRACH configuration index may be increased.

For another example, the network device may determine, based on the preamble transmit power of the terminal device in the first information, whether the preamble transmit power of the terminal device and a maximum preamble transmit power of the terminal device are the same as or less than a threshold. If the preamble transmit power of the terminal device and the maximum preamble transmit power of the terminal device are the same as or less than the threshold, the network device may increase the maximum preamble transmit power of the terminal device. Alternatively, the network device may determine whether indication is true or false based on the maximum transmit power satisfaction indication information (true or false) of the terminal device in the first information. If the indication is true, the network device may increase the maximum preamble transmit power of the terminal device.

For another example, based on the load information of the random access channel and/or the load information of the physical uplink shared channel in the first information, the network device may extend a backoff time when one of the two loads is relatively large. Optionally, if the backoff time is relatively long in this case, the backoff time may be greatly extended.

It should be understood that the foregoing method for optimizing the RACH resource is merely an example rather than a limitation.

Optionally, the method 300 may further include a step S340.

S340: The network device sends fourth information. Correspondingly, the terminal device receives the fourth information.

The fourth information may include the optimized configuration parameter used for the random access.

Optionally, the network device may send the fourth information to the terminal device by using a system broadcast message. The network device may send the fourth information to the terminal device by using RRC dedicated signaling. Alternatively, the network device may send the fourth information to the terminal device by using a MAC message or a physical layer message. This is not limited in this embodiment of this application.

Figure 4:
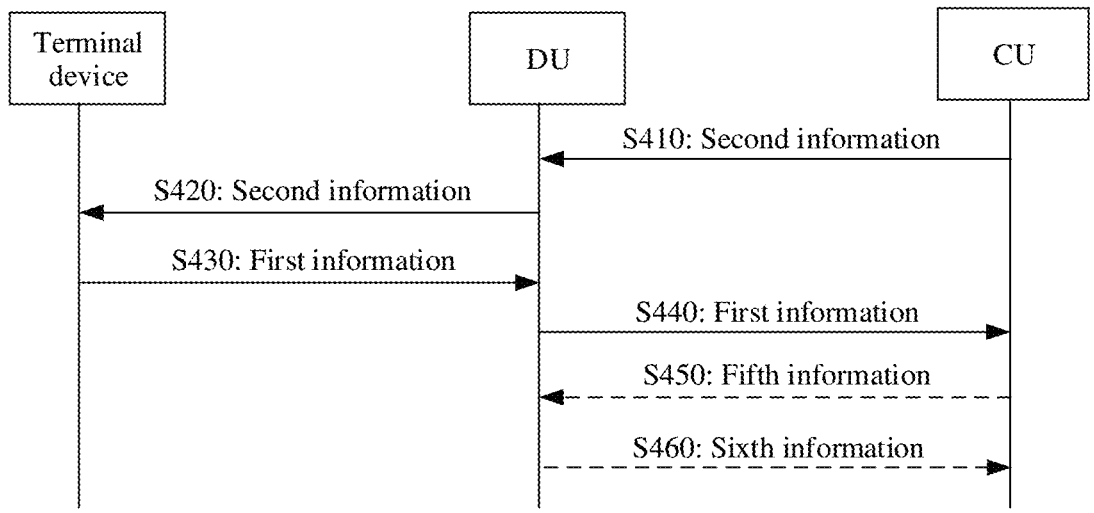
FIG. 4 is a schematic flowchart of a communication method according to another embodiment of this application.

FIG. 4 is a schematic flowchart of a communication method 400 according to an embodiment of this application. It should be understood that FIG. 4 shows steps or operations of the communication method. However, these steps or operations are merely examples. In this embodiment of this application, other operations or variations of the operations in FIG. 4 may be further performed, or not all steps need to be performed. Alternatively, these steps may be performed in other orders.

It should be understood that a network device in the method 400 may be a network device in the CU-DU architecture in FIG. 2. As shown in FIG. 2, the network device may include a centralized unit CU and a distributed unit DU.

S410: The CU sends second information to the DU.

Optionally, the second information may be used to request the first information.

For specific descriptions of the second information, refer to the descriptions of the embodiment in the method 300. Details are not described herein again.

Optionally, the CU may send the second information to the DU by using an F1AP message.

S420: The DU sends the second information to a terminal device.

Optionally, for a message used by the DU to send the second information to the terminal device, refer to the description in the embodiment in the method 300. Details are not described herein again.

It should be noted that, herein, the CU sends the second information to UE by using the DU. For example, the CU carries an RACH report request (namely, the second information) in an F1 interface message (for example, a DL RRC message transfer message) and sends the RACH report request to the DU. The DU forwards the RACH report request to the UE after receiving the RACH report request.

S430: The terminal device sends the first information to the DU.

The first information includes one or more types of information about an associated beam for a random access success of the terminal device, information about an associated uplink carrier for a random access success of the terminal device, or information about an associated bandwidth part BWP for a random access success of the terminal device, and/or the first information includes information about a random access channel RACH resource for a random access failure of the terminal device. The random access failure of the terminal device may include one or more of a 2-step random access failure, a 4-step random access failure, a dedicated random access channel RACH resource random access failure, or a common RACH resource random access failure.

For specific descriptions of the first information, refer to the descriptions of the embodiment in the method 300. Details are not described herein again. S440: The DU sends the first information to the CU.

Optionally, the DU may send the first information to the CU by using an F1AP message.

In this embodiment of this application, after receiving the first information, the CU may optimize, based on the first information, a configuration parameter used for random access. For a specific optimization method, refer to the descriptions of the embodiment in the method 300. Details are not described herein again.

It should be noted that, herein, the terminal device sends the first information to the CU by using the DU. For example, the terminal device sends an RACH report (namely, the first information) to the DU, and the DU carries the RACH report to an F1 interface message (for example, a UL RRC message transfer message) and sends the RACH report to the CU. Optionally, there may be the following several cases based on different configuration parameters that each node (the CU and the DU) is responsible for optimization.

Case 1:

The CU is responsible for optimizing one or more of a first threshold, a second threshold, and a third threshold. The DU is responsible for optimizing an RACH resource.

The method 400 may further include a step S450 and/or a step S460 for Case 1.

S450: The CU sends fifth information to the DU.

Optionally, the fifth information may include indication information. The indication information may be used to indicate the DU to optimize the RACH resource.

Optionally, the CU may send the fifth information to the DU by using an F1AP message.

Correspondingly, the DU may optimize the RACH resource.

Optionally, the fifth information may further include one or more of an optimized first threshold, an optimized second threshold, and/or an optimized third threshold.

For example, the CU may optimize the one or more of the first threshold, the second threshold, and/or the third threshold based on the first information, and send the one or more of the optimized first threshold, the optimized second threshold, and/or the optimized third threshold to the DU by using the fifth information.

In a possible implementation, the DU may send an optimized RACH resource and the one or more of the optimized first threshold, the optimized second threshold, and/or the optimized third threshold to the terminal device. For example, the DU may send the optimized first threshold, the optimized second threshold, and/or the optimized third threshold, and the optimized RACH resource to the terminal device by using an SIB 1.

In another possible implementation, the DU may send the optimized RACH resource to the CU. In this case, the method 400 may further include the step S460.

S460: The DU sends sixth information to the CU.

Optionally, the sixth information may include the optimized RACH resource.

Optionally, the DU may send the sixth information to the CU by using an F1AP message.

In this case, the CU may send, to the terminal device, the optimized RACH resource and one or more of an optimized first threshold, an optimized second threshold, and/or an optimized third threshold. For example, the CU may send, to the terminal device, the optimized RACH resource and the one or more of the optimized first threshold, the optimized second threshold, and/or the optimized third threshold by using RRC dedicated signaling.

Case 2:

The CU is responsible for optimizing one or more of a first threshold, a second threshold, and a third threshold, and optimizing an RACH resource.

The method 400 may further include a step S450 for Case 2.

S450: The CU sends fifth information to the DU.

Optionally, before the step S450, the CU may optimize the RACH resource and the one or more of the first threshold, the second threshold, and/or the third threshold based on the first information.

Optionally, the fifth information may include an optimized first threshold, an optimized second threshold, and/or an optimized third threshold, and an optimized RACH resource.

For example, the CU may optimize the RACH resource, and the one or more of the first threshold, the second threshold, and/or the third threshold based on the first information, and send the optimized RACH resource and the one or more of the optimized first threshold, the optimized second threshold, and/or the optimized third threshold to the DU by using the fifth information.

In this case, the DU may send the optimized RACH resource and the one or more of the optimized first threshold, the optimized second threshold, and/or the optimized third threshold to the terminal device. For example, the DU may send the optimized RACH resource and the one or more of the optimized first threshold, the optimized second threshold, and/or the optimized third threshold to the terminal device by using an SIB 1.

Alternatively, the fifth information may include an optimized RACH resource.

For example, the CU may optimize the RACH resource and the one or more of the first threshold, the second threshold, and/or the third threshold based on the first information, and send only the optimized RACH resource to the DU by using the fifth information.

Optionally, the DU may send the optimized RACH resource to the terminal device. For example, the DU may send the optimized RACH resource to the terminal device by using an SIB 1. In this case, the CU may send one or more of an optimized first threshold, an optimized second threshold, and/or an optimized third threshold to the terminal device.

Case 3:

The DU is responsible for optimizing one or more of a first threshold, a second threshold, and a third threshold, and optimizing an RACH resource.

The method 400 may further include a step S450 and/or a step S460 for Case 3.

S450: The CU sends fifth information to the DU.

Optionally, the fifth information may include the first information.

For example, the CU may send the first information to the DU by using the fifth information. Optionally, the CU may send the fifth information to the DU by using an F1AP message.

Alternatively, the CU may parse the first information, and send the parsed first information to the DU by using the fifth information.

Correspondingly, after receiving the first information (or the parsed first information), the DU may optimize the RACH resource and the one or more of the first threshold, the second threshold, and/or the third threshold based on the first information (or the parsed first information).

S460: The DU sends sixth information to the CU.

Optionally, the sixth information may include an optimized RACH resource and one or more of an optimized first threshold, an optimized second threshold, and/or an optimized third threshold.

For example, the DU may send the optimized RACH resource and the one or more of the optimized first threshold, the optimized second threshold, and/or the optimized third threshold to the CU by using the sixth information. Optionally, the DU may send the sixth information to the CU by using an F1AP message.

It should be understood that the F1AP message used for interaction between the CU and the DU may be an existing F1AP message, or may be a newly defined F1AP message. This is not limited in this embodiment of this application. The existing F1AP message may be a gNB-CU configuration update message, a gNB-DU configuration update message, a gNB-CU configuration update response (gNB-CU configuration update acknowledge) message, a gNB-DU configuration update response (gNB-DU configuration update acknowledge) message, a UE context setup request message, a UE context modification request message, a UE context setup response message, a UE context modification response message, a UE context setup request (UE context setup required) message, a UE context modification request (UE context modification required) message, a UE context release command message, a UE context release request message, or a UE context release complete message, or the like.

It should be noted that, for a specific optimization method in the method 400, refer to the description in the embodiment in the method 300. Details are not described herein again.

It may be understood that the descriptions in FIG. 3 and FIG. 4 may be independently applicable, combined, or referenced.

The foregoing describes in detail the communication methods in the embodiments of this application with reference to FIG. 3 and FIG. 4. The following describes in detail communications apparatuses in the embodiments of this application with reference to FIG. 5 to FIG. 7.

Figure 5:
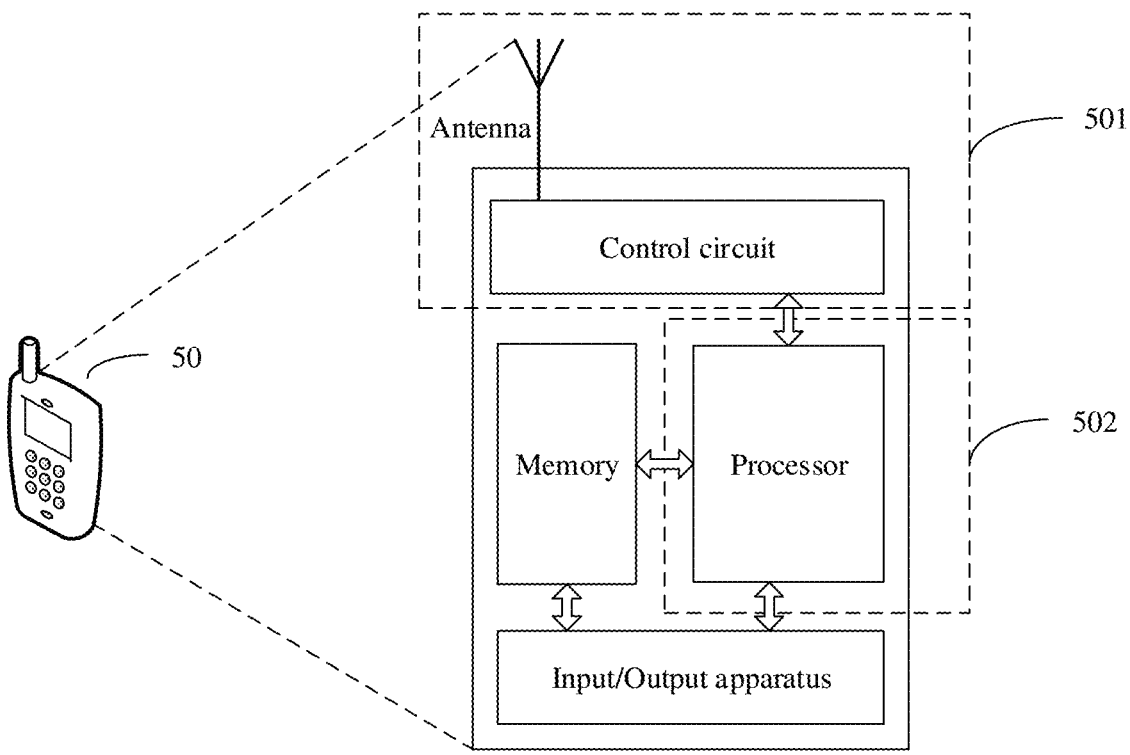
FIG. 5 is a schematic diagram of a terminal device according to an embodiment of this application.

FIG. 5 is a schematic diagram of a structure of a terminal device according to an embodiment of this application. The terminal device is used in the system shown in FIG. 1, and performs functions of the terminal device in the foregoing method embodiments. For ease of description, FIG. 5 shows only main means of the terminal device. As shown in FIG. 5, the terminal device 50 includes a processor, a memory, a control circuit, an antenna, and an input/output apparatus. The processor is mainly configured to process a communications protocol and communication data, control the entire terminal device, execute a software program, and process data of the software program. For example, the processor is configured to support the terminal device in performing an action described in the foregoing method embodiments, for example, determining a precoding matrix based on received PMI and RI, to precode a signal and send a precoded signal. The memory is mainly configured to store a software program and data, for example, store a correspondence that is between indication information and combination information, described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to receive/send a radio frequency signal in a form of an electromagnetic wave. The input/output apparatus, for example, a touchscreen, a display screen, or a keyboard, is mainly configured to receive data entered by a user and output data to the user.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of the electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 5 shows only one memory and only one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 5 may integrate functions of the baseband processor and the central processing unit. A person skilled in the art may understand that the baseband processor and the central processing unit may alternatively be independent processors, and interconnected by using a technology, for example, a bus. A person skilled in the art may understand that the terminal device may include a plurality of baseband processors to be used in different network standards, the terminal device may include a plurality of central processing units to improve a processing capability of the terminal device, and means of the terminal device may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

In this embodiment of this application, the antenna and the control circuit that have a transceiver function may be considered as a transceiver unit 501 of the terminal device 50. For example, the transceiver unit 501 is configured to support the terminal device in performing the receiving function and the sending function described in FIG. 3 or FIG. 4. The processor having a processing function is considered as a processing unit 502 of the terminal device 50. As shown in FIG. 5, the terminal device 50 includes the transceiver unit 501 and the processing unit 502. The transceiver unit may also be referred to as a transceiver, a transceiver machine, a transceiver apparatus, or the like. Optionally, a component configured to implement the receiving function in the transceiver unit 501 may be considered as a receiving unit. A component configured to implement the sending function in the transceiver unit 501 may be considered as a sending unit. In other words, the transceiver unit 501 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processing unit 502 may be configured to execute an instruction stored in the memory, to control the transceiver unit 501 to receive a signal and/or send a signal, so as to complete a function of the terminal device in the foregoing method embodiments. In an implementation, it may be considered that the functions of the transceiver unit 501 are implemented by using a transceiver circuit or a special-purpose transceiver chip.

Figure 6:
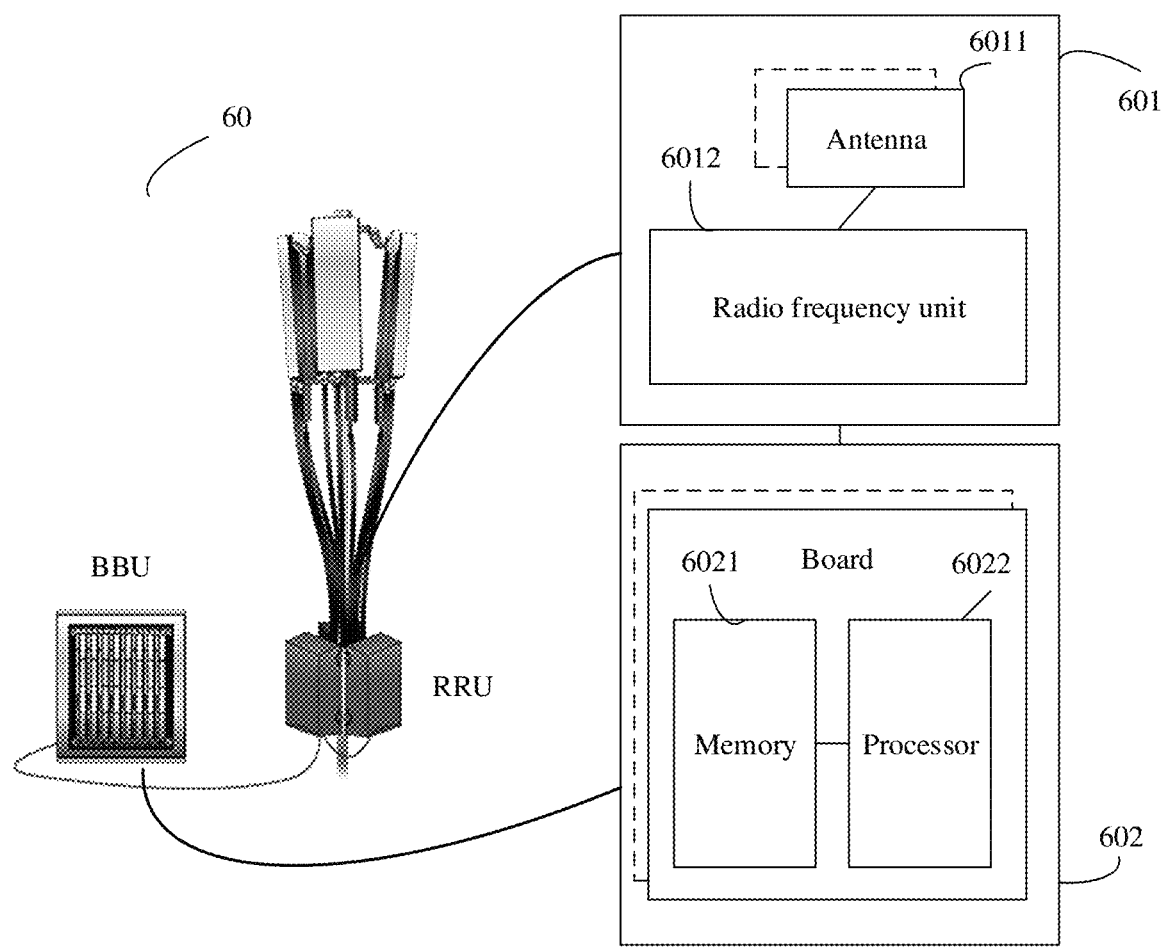
FIG. 6 is a schematic diagram of a structure of a network device according to an embodiment of this application.

FIG. 6 is a schematic diagram of a structure of a network device according to an embodiment of this application. For example, FIG. 6 may be a schematic diagram of a structure of a base station. As shown in FIG. 6, the base station may be used in the system shown in FIG. 1, to perform a function of the network device in the foregoing method embodiments. The base station 60 may include one or more radio frequency units, such as remote radio units (RRU) 601 and one or more baseband units (BBUs (which may also be referred to as digital units, DUs) 602. The RRU 601 may be referred to as a transceiver unit, a transceiver, a transceiver circuit, a transceiver machine, or the like, and may include at least one antenna 6011 and a radio frequency unit 6012. The RRU 601 is mainly configured to send and receive a radio frequency signal, and perform conversion between a radio frequency signal and a baseband signal. For example, the RRU 601 is configured to send the signaling message in the foregoing embodiments to a terminal device. The BBU 602 is mainly configured to perform baseband processing, control the base station, and the like. The RRU 601 and the BBU 602 may be physically disposed together, or may be physically disposed separately. To be specific, the base station is a distributed base station.

The BBU 602 is a control center of the base station, may also be referred to as a processing unit, and is mainly configured to complete baseband processing functions, such as channel coding, multiplexing, modulation, and spectrum spreading. For example, the BBU (a processing unit) 602 may be configured to control the base station to perform an operation procedure related to the network device in the method embodiments.

In an example, the BBU 602 may include one or more boards. A plurality of boards may jointly support a radio access network (such as an LTE network) of a single access standard, or may separately support radio access networks (such as an LTE network, a 5G network, and another network) of different access standards. The BBU 602 further includes a memory 6021 and a processor 6022. The memory 6021 is configured to store a necessary instruction and necessary data. For example, the memory 6021 stores a correspondence between a codebook index and a precoding matrix in the foregoing embodiments. The processor 6022 is configured to control the base station to perform a necessary action. For example, the processor 6022 is configured to control the base station to perform an operation procedure related to the network device in the foregoing method embodiments. The memory 6021 and the processor 6022 may serve the one or more boards. In other words, each board may be independently disposed with a memory and a processor. Alternatively, a plurality of boards may share a same memory and a same processor. In addition, each board may further be disposed with a necessary circuit.

Figure 7:
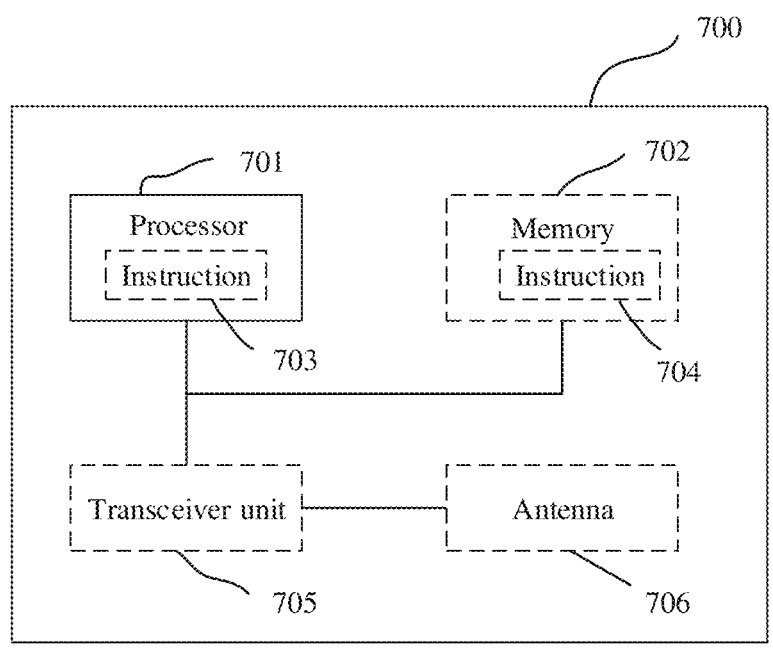
FIG. 7 is a schematic diagram of a structure of a communications apparatus according to an embodiment of this application.

FIG. 7 is a schematic diagram of a structure of a communications apparatus 700. The apparatus 700 may be configured to implement the methods described in the foregoing method embodiments. For details, refer to the descriptions in the foregoing method embodiments. The communications apparatus 700 may be a chip, a network device (such as a base station), a terminal device, another network device, or the like.

The communications apparatus 700 includes one or more processors 701. The processor 701 may be a general purpose processor, a dedicated processor, or the like. For example, the processor 701 may be a baseband processor or a central processing unit. The baseband processor may be configured to process a communications protocol and communication data. The central processing unit may be configured to control the communications apparatus (for example, a base station, a terminal, or a chip), execute a software program, and process data of the software program. The communications apparatus may include a transceiver unit that is configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 700 includes the one or more processors 701, and the one or more processors 701 may implement the method performed by the network device or the terminal device in the embodiment shown in FIG. 2.

In a possible design, the communications apparatus 700 includes a means for determining first information and a means for sending the first information. One or more processors may be used to implement functions of the means for determining the first information and the means for sending the first information. For example, the first information may be determined by using the one or more processors, and sent by using a transceiver, an input/output circuit, or an interface of a chip. For the first information, refer to related descriptions in the foregoing method embodiments.

In a possible design, the communications apparatus 700 includes a means for receiving first information and a means for determining a configuration parameter. For receiving the first information and how to determine the configuration parameter, refer to related descriptions in the foregoing method embodiments. For example, the first information may be received by using a transceiver, an input/output circuit, or an interface of a chip, and the configuration parameter is determined by using one or more processors.

Optionally, in addition to the methods in the embodiment shown in FIG. 3 or FIG. 4, the processor 701 may further implement another function.

Optionally, in a design, the processor 701 may further include an instruction 703. The instruction may be run on the processor, so that the communications apparatus 700 performs the methods described in the foregoing method embodiments.

In still another possible design, the communications apparatus 700 may further include a circuit. The circuit may implement a function of the network device or the terminal device in the foregoing method embodiments.

In still another possible design, the communications apparatus 700 may include one or more memories 702. The memory stores an instruction 704. The instruction may be run on the processor, so that the communications apparatus 700 performs the methods described in the foregoing method embodiments. Optionally, the memory may further store data. Optionally, the processor may alternatively store an instruction and/or data. For example, the one or more memories 702 may store the correspondence described in the foregoing embodiments, or the related parameter or table provided in the foregoing embodiments. The processor and the memory may be separately disposed, or may be integrated together.

In still another possible design, the communications apparatus 700 may further include a transceiver unit 705 and an antenna 706. The processor 701 may be referred to as a processing unit, and controls the communications apparatus (a terminal or a base station). The transceiver unit 705 may be referred to as a transceiver, a transceiver circuit, a transceiver machine, or the like, and is configured to implement a transceiver function of the communications apparatus by using the antenna 706.

This application further provides a communications system, including the foregoing one or more network devices and one or more terminal devices.

It should be understood that, the processor in the embodiments of this application may be a central processing unit (CPU). The processor may further be another general purpose processor, a digital signal processor (DSP), an application-specific integrated circuit (application specific integrated circuit, ASIC), a field programmable gate array (FPGA), or another programmable logic device, discrete gate or transistor logic device, discrete hardware component, or the like. The general purpose processor may be a microprocessor, or the processor may be any conventional processor, or the like.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example rather than a limitative description, random access memories (RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" refers to one or more, and "a plurality of" refers to two or more. "At least one item (piece) of the following" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
performing a random access procedure with a network device; and
sending third information to the network device, wherein the third information indicates:
whether information about a beam associated with a random access attempt of a terminal device is above or below a first threshold, wherein the first threshold comprises a reference signal received power (RSRP) threshold of a synchronization signal block (SSB), the beam associated with the random access attempt of the terminal device including the SSB, or the first threshold comprises an RSRP threshold of a channel state information reference signal (CSI-RS), the beam associated with the random access attempt of the terminal device including the CSI-RS.

2. The method according to claim 1, wherein the beam associated with the random access attempt of the terminal device comprises the SSB or the CSI-RS, and the information about the beam associated with the random access attempt of the terminal device comprises one or more of following:
a signal to interference plus noise ratio (SINR) of the SSB, an SINR of the CSI-RS, a reference signal received power (RSRP) of the SSB, a RSRP of the CSI-RS, a reference signal received quality (RSRQ) of the SSB, or a RSRQ of the CSI-RS.

3. The method according to claim 1, further comprising:
determining first information, wherein the first information comprises:
the information about the beam associated with the random access attempt of the terminal device; and
sending the first information.

4. The method according to claim 3, wherein the method further comprises:
receiving second information, wherein the second information requests the first information.

5. The method according to claim 1, wherein the third information further indicates:
information about whether a carrier associated with the random access attempt of the terminal device is above or below a second threshold, wherein the second threshold comprises a reference signal received power (RSRP) threshold of the carrier.

6. The method according to claim 5, wherein the carrier associated with the random access attempt of the terminal device comprises a normal uplink carrier or a supplementary uplink carrier, and the information about the carrier associated with the random access attempt of the terminal device comprises one or more of following:
a signal to interference plus noise ratio (SINR) associated with the normal uplink carrier, a RSRP associated with the normal uplink carrier, a reference signal received quality (RSRQ) associated with the normal uplink carrier, an SINR associated with the supplementary uplink carrier, a RSRP associated with the supplementary uplink carrier, or a RSRQ associated with the supplementary uplink carrier.

7. The method according to claim 1, wherein the method further comprises:
receiving fourth information, wherein the fourth information comprises an optimized configuration parameter used for a random access.

8. The method according to claim 7, wherein the optimized configuration parameter used for the random access comprises one or more of an updated first threshold or an updated RACH resource.

9. A communication method, comprising:
performing a random access procedure with a terminal device; and
receiving third information from the terminal device, wherein the third information indicates:
whether information about a beam associated with a random access attempt of the terminal device is above or below a first threshold, wherein the first threshold comprises a reference signal received power (RSRP) threshold of a synchronization signal block (SSB), the beam associated with the random access attempt of the terminal device including the SSB, or the first threshold comprises an RSRP threshold of a channel state information reference signal (CSI-RS), the beam associated with the random access attempt of the terminal device including the CSI-RS.

10. The method according to claim 9, wherein the beam associated with the random access attempt of the terminal device comprises the SSB or the CSI-RS, and the information about the beam associated with the random access attempt of the terminal device comprises one or more of following:
a signal to interference plus noise ratio (SINR) of the SSB, an SINR of the CSI-RS, a reference signal received power (RSRP) of the SSB, a RSRP of the CSI-RS, a reference signal received quality (RSRQ) of the SSB, or a RSRQ of the CSI-RS.

11. The method according to claim 9, comprising:
receiving first information, wherein the first information comprises:
the information about the beam associated with the random access attempt of the terminal device.

12. The method according to claim 11, wherein the method further comprises:
sending second information, wherein the second information requests the first information.

13. The method according to claim 11, wherein the information about the beam associated with the random access attempt of the terminal device further comprises one or more of following:
a preamble resource type, a quantity of preamble attempts, preamble information used in a preamble attempt, conflict detection indication, load information of a random access channel, load information of a physical uplink shared channel, transmit power of the terminal device, maximum transmit power satisfaction indication information of the terminal device, failure duration information, access latency information, path loss estimation information, backoff time information, or a random access type.

14. The method according to claim 11, wherein the information about the beam further comprises fallback indication information, and wherein the fallback indication information indicates at least one of the following: 2 step random access is fallen back to 4-step random access, or
a random access channel (RACH) resource used by the terminal device for a random access is fallen back from a dedicated RACH resource to a common RACH resource.

15. The method according to claim 9, wherein the third information further indicates:
information about whether a carrier associated with the random access attempt of the terminal device is above or below a second threshold, wherein the second threshold comprises a reference signal received power (RSRP) threshold of the carrier.

16. The method according to claim 15, wherein a carrier associated with the random access attempt of the terminal device comprises a normal uplink carrier or a supplementary uplink carrier, and the information about the carrier associated with the random access attempt of the terminal device comprises one or more of following:
a signal to interference plus noise ratio (SINR) associated with the normal uplink carrier, a reference signal received power (RSRP) associated with the normal uplink carrier, a reference signal received quality (RSRQ) associated with the normal uplink carrier, an SINR associated with the supplementary uplink carrier, a RSRP associated with the supplementary uplink carrier, or a RSRQ associated with the supplementary uplink carrier.

17. An apparatus, comprising at least one processor and a circuit for receiving or sending a signal, wherein the at least one processor is configured to execute instructions stored in a memory, to cause the apparatus to perform:
performing a random access procedure with a network device; and
sending third information to the network device, wherein the third information indicates:
whether information about a beam associated with a random access attempt of a terminal device is above or below a first threshold, wherein the first threshold comprises: a reference signal received power (RSRP) threshold of a synchronization signal block (SSB), the beam associated with the random access attempt of the terminal device including the SSB, or a RSRP threshold of a channel state information reference signal (CSI-RS), the beam associated with the random access attempt of the terminal device including the CSI-RS.

18. An apparatus, comprising at least one processor and a circuit for receiving or sending a signal, wherein the at least one processor is configured to execute instructions stored in a memory, to cause the apparatus to perform:
performing a random access procedure with a terminal device; and
receiving third information from the terminal device, wherein the third information indicates:
whether information about a beam associated with a successful random access attempt of the terminal device is above or below a first threshold, wherein the first threshold comprises a reference signal received power (RSRP) threshold of a synchronization signal block (SSB), the beam associated with the random access attempt of the terminal device including the SSB, or the first threshold comprises a RSRP threshold of a channel state information reference signal (CSI-RS), the beam associated with the random access attempt of the terminal device including the CSI-RS.

19. The apparatus according to claim 17, wherein the beam associated with the random access attempt of the terminal device comprises: the SSB or the CSI-RS, and the information about the beam associated with the random access attempt of the terminal device comprises one or more of following:
a signal to interference plus noise ratio (SINR) of the SSB, an SINR of the CSI-RS, a reference signal received power (RSRP) of the SSB, a RSRP of the CSI-RS, a reference signal received quality (RSRQ) of the SSB, or a RSRQ of the CSI-RS.

20. The apparatus according to claim 18, wherein the beam associated with the random access attempt of the terminal device comprises: the SSB or the CSI-RS, and the information about the beam associated with the random access attempt of the terminal device comprises one or more of following:
a signal to interference plus noise ratio (SINR) of the SSB, an SINR of the CSI-RS, a reference signal received power (RSRP) of the SSB, a RSRP of the CSI-RS, a reference signal received quality (RSRQ) of the SSB, or a RSRQ of the CSI-RS.

21. The apparatus according to claim 17, wherein the third information further indicates:
information about whether a carrier associated with the random access attempt of the terminal device is above or below a second threshold, wherein the second threshold comprises a reference signal received power (RSRP) threshold of the carrier.

22. The apparatus according to claim 18, wherein the third information further indicates:

information about whether a carrier associated with the random access attempt of the terminal device is above or below a second threshold, wherein the second threshold comprises a reference signal received power (RSRP) threshold of the carrier.

23. The apparatus according to claim 21, wherein a carrier associated with the random access attempt of the terminal device comprises a normal uplink carrier or a supplementary uplink carrier, and the information about the uplink carrier associated with the random access attempt of the terminal device comprises one or more of following:

a signal to interference plus noise ratio (SINR) associated with the normal uplink carrier, a reference signal received power (RSRP) associated with the normal uplink carrier, a reference signal received quality (RSRQ) associated with the normal uplink carrier, an SINR associated with the supplementary uplink carrier, a RSRP associated with the supplementary uplink carrier, or a RSRQ associated with the supplementary uplink carrier.

24. The apparatus according to claim 22, wherein the carrier associated with the random access attempt of the terminal device comprises a normal uplink carrier or a supplementary uplink carrier, and the information about the uplink carrier associated with the random access attempt of the terminal device comprises one or more of following:

a signal to interference plus noise ratio (SINR) associated with the normal uplink carrier, a reference signal received power (RSRP) associated with the normal uplink carrier, a reference signal received quality (RSRQ) associated with the normal uplink carrier, an SINR associated with the supplementary uplink carrier, a RSRP associated with the supplementary uplink carrier, or a RSRQ associated with the supplementary uplink carrier.

* * * * *